US007841638B2

(12) United States Patent  (10) Patent No.: US 7,841,638 B2
Smith  (45) Date of Patent: Nov. 30, 2010

(54) VEHICLE CARGO TAILGATE ENCLOSURE

(75) Inventor: Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 0 days.

(21) Appl. No.: 11/924,537

(22) Filed: Oct. 25, 2007

(65) Prior Publication Data

US 2008/0111390 A1    May 15, 2008

Related U.S. Application Data

(60) Provisional application No. 60/863,339, filed on Oct. 27, 2006.

(51) Int. Cl.
*B62D 33/02* (2006.01)
(52) U.S. Cl. .................... 296/26.11; 296/37.6; 296/57.1
(58) Field of Classification Search .............. 296/26.01, 296/26.08, 26.11, 37.6, 50, 51, 57.1; D12/414
See application file for complete search history.

(56) References Cited

U.S. PATENT DOCUMENTS

| 171,736 | A | 1/1876 | Mooney |
|---|---|---|---|
| 341,307 | A | 5/1886 | Altschwager |
| 600,898 | A | 3/1898 | Smith |
| 1,242,035 | A | 10/1917 | Pierson et al. |
| 1,266,521 | A | 5/1918 | Norquist |
| 1,272,620 | A | 7/1918 | Carlson |
| 1,289,997 | A | 12/1918 | Wyeth |
| 1,655,777 | A | 1/1928 | Weiland |
| 1,655,797 | A | 1/1928 | Peck |
| 1,764,615 | A | 6/1930 | Edwards |
| 1,812,580 | A | 6/1931 | Black |
| 2,514,466 | A | 7/1950 | Bildhauer |
| D160,213 | S | 9/1950 | Samuelson |
| 2,621,357 | A | 12/1952 | Stuman |

(Continued)

FOREIGN PATENT DOCUMENTS

SU    0629098    9/1978

OTHER PUBLICATIONS

Complaint, *Ford Motor Company* v. *89908, Inc.* d/b/a AMP Research and/or American Moto Products Research, Case No. 2:06-cv-13316, U.S. District Court for the Eastern District of Michigan, Southern Division, filed Jul. 21, 2006.

(Continued)

*Primary Examiner*—Glenn Dayoan
*Assistant Examiner*—Gregory Blankenship
(74) *Attorney, Agent, or Firm*—Knobbe, Martens, Olson & Bear, LLP

(57) ABSTRACT

An improved vehicle cargo tailgate enclosure particularly adapted for ease of installation and removal. The tailgate enclosure comprises two side walls and a rear wall. The rear wall is configured to slope upwardly and rearwardly to provide additional storage space to a cargo bed of a vehicle. The cargo tailgate enclosure further comprises tubular members which comprise a non-circular cross section which provide exceptional strength a structural stability to the cargo tailgate enclosure. The cargo tailgate enclosure further comprises a plurality of upright members. Some of the upright members are configured to attach the cargo tailgate enclosure to a vehicle and to cap the tubular members. Other upright members are configured to support the tailgate enclosure against the surface cargo bed or a tailgate of a vehicle.

11 Claims, 19 Drawing Sheets

U.S. PATENT DOCUMENTS

| | | |
|---|---|---|
| 2,626,179 A | 1/1953 | Gonzalez |
| RE23,814 E | 4/1954 | Ingram |
| 2,713,897 A | 7/1955 | Teague et al. |
| 2,720,414 A | 10/1955 | Hart |
| 2,795,363 A | 6/1957 | Turner |
| 2,797,959 A | 7/1957 | Brice |
| 3,656,801 A | 4/1972 | Doutt et al. |
| 3,734,560 A | 5/1973 | Cramblet |
| 3,902,599 A | 9/1975 | Stromberg |
| 4,023,850 A | 5/1977 | Tillery |
| 4,063,774 A | 12/1977 | Hanks |
| 4,132,335 A | 1/1979 | Ingram |
| 4,136,905 A | 1/1979 | Morgan |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,596,417 A | 6/1986 | Bennett |
| 4,635,992 A | 1/1987 | Hamilton et al. |
| 4,652,035 A | 3/1987 | Austin, Jr. |
| D291,789 S | 9/1987 | Noga |
| D294,137 S | 2/1988 | Robson |
| 4,749,226 A | 6/1988 | Heft |
| 4,750,773 A | 6/1988 | Chapline et al. |
| 4,770,458 A | 9/1988 | Burke et al. |
| 4,778,213 A | 10/1988 | Palmer |
| 4,786,119 A | 11/1988 | Smuda |
| D300,734 S | 4/1989 | Kruitbosch |
| 4,824,158 A | 4/1989 | Peters et al. |
| 4,828,312 A | 5/1989 | Kinkel et al. |
| 4,830,242 A | 5/1989 | Painter |
| 4,875,724 A | 10/1989 | Gruber |
| D305,111 S | 12/1989 | Zagner |
| 5,024,409 A | 6/1991 | Bohnen |
| 5,037,152 A | 8/1991 | Hendricks |
| 5,037,153 A | 8/1991 | Stark |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,123,691 A | 6/1992 | Ginn |
| 5,127,697 A | 7/1992 | St. Marie |
| 5,129,665 A | 7/1992 | Sutter et al. |
| 5,147,103 A | 9/1992 | Ducote |
| 5,154,470 A * | 10/1992 | Bringman, Jr. ............ 296/26.11 |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| 5,253,913 A | 10/1993 | Metivier |
| 5,299,773 A | 4/1994 | Bertrand |
| 5,310,155 A | 5/1994 | Wu |
| 5,396,915 A | 3/1995 | Bomar |
| D360,614 S | 7/1995 | Alcocer |
| 5,441,324 A | 8/1995 | Gold |
| 5,456,511 A | 10/1995 | Webber |
| 5,468,038 A | 11/1995 | Sauri |
| D365,323 S | 12/1995 | Napierkowski et al. |
| 5,588,630 A | 12/1996 | Chen-Chao |
| 5,622,296 A | 4/1997 | Pirhonen et al. |
| 5,658,033 A | 8/1997 | Delaune |
| 5,685,686 A | 11/1997 | Burns |
| 5,700,047 A * | 12/1997 | Leitner et al. ............ 296/26.11 |
| 5,730,342 A | 3/1998 | Tien |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,775,759 A | 7/1998 | Cummins |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |
| 5,857,724 A | 1/1999 | Jarman |
| 5,862,964 A | 1/1999 | Moliner |
| D410,429 S | 6/1999 | Derecktor |
| 5,911,464 A * | 6/1999 | White .................... 296/26.11 |
| 5,924,614 A | 7/1999 | Kuntze et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,082,801 A | 7/2000 | Owen et al. |
| 6,102,265 B1 | 8/2000 | Stapleton |
| 6,112,964 A | 9/2000 | Cucheran et al. |
| 6,113,173 A * | 9/2000 | Leitner et al. ............ 296/26.11 |
| 6,120,076 A | 9/2000 | Adsit et al. |
| 6,123,305 A | 9/2000 | Lukasavitz |
| 6,149,219 A | 11/2000 | Schambre et al. |
| 6,227,593 B1 | 5/2001 | De Valcourt |
| 6,257,637 B1 | 7/2001 | Reed |
| 6,269,990 B1 | 8/2001 | Gray |
| 6,283,525 B1 | 9/2001 | Morse |
| 6,338,515 B1 | 1/2002 | Munhall |
| 6,340,190 B1 | 1/2002 | Rosebrugh et al. |
| 6,378,926 B1 | 4/2002 | Renze et al. |
| 6,390,427 B1 | 5/2002 | McConnell et al. |
| 6,402,215 B1 * | 6/2002 | Leitner et al. ............ 296/26.11 |
| 6,422,627 B1 | 7/2002 | Kuhn et al. |
| 6,425,618 B1 * | 7/2002 | Garland et al. ................ 296/3 |
| 6,454,338 B1 | 9/2002 | Glickman et al. |
| 6,471,277 B1 | 10/2002 | Scensny et al. |
| 6,494,520 B2 | 12/2002 | Brzenchek et al. |
| 6,513,688 B2 | 2/2003 | Kmita et al. |
| 6,540,123 B1 * | 4/2003 | Kmita et al. ................ 224/403 |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,598,922 B2 | 7/2003 | Morse et al. |
| 6,607,228 B2 | 8/2003 | Carter, III et al. |
| 6,626,478 B1 | 9/2003 | Minton |
| 6,676,182 B2 | 1/2004 | Fitts |
| 6,719,261 B2 | 4/2004 | Wadsworth |
| 6,719,345 B2 * | 4/2004 | Ootsuka et al. .......... 296/26.08 |
| 6,805,392 B2 | 10/2004 | Leitner et al. |
| 6,889,878 B2 | 5/2005 | Parsons |
| 6,918,624 B2 | 7/2005 | Miller et al. |
| 6,923,488 B2 | 8/2005 | Bruford et al. |
| 6,948,763 B2 | 9/2005 | Robbins |
| 6,966,595 B2 | 11/2005 | Bruford et al. |
| 6,983,972 B2 | 1/2006 | Tan et al. |
| 6,994,389 B1 * | 2/2006 | Graffy et al. ............. 296/26.11 |
| 7,007,995 B1 * | 3/2006 | Scarberry et al. ........ 296/26.11 |
| 7,063,366 B2 * | 6/2006 | Leitner et al. ............ 296/26.11 |
| 7,093,870 B2 | 8/2006 | Kim et al. |
| 7,111,886 B1 * | 9/2006 | Miller et al. ............. 296/26.11 |
| 7,121,604 B2 * | 10/2006 | Reed ..................... 296/26.11 |
| 7,152,902 B2 | 12/2006 | Moen et al. |
| 7,195,432 B2 * | 3/2007 | Earle et al. ................... 410/94 |
| D544,826 S * | 6/2007 | Smith ....................... D12/414 |
| 7,229,116 B1 | 6/2007 | Bruford et al. |
| 7,240,940 B2 * | 7/2007 | Leitner ................... 296/26.11 |
| 7,267,387 B1 | 9/2007 | Bruford et al. |
| D553,072 S * | 10/2007 | Smith ....................... D12/414 |

| | | | |
|---|---|---|---|
| 7,347,473 B2 | 3/2008 | Miller et al. | |
| D568,230 S | 5/2008 | Smith | |
| 7,393,035 B2 * | 7/2008 | Leitner et al. | 296/26.08 |
| 7,464,976 B2 | 12/2008 | Smith | |
| 7,488,021 B1 | 2/2009 | Roos et al. | |
| D597,924 S | 8/2009 | Smith | |
| 7,654,598 B2 | 2/2010 | Leitner et al. | |
| 2002/0000732 A1 | 1/2002 | Sanders | |
| 2002/0096901 A1 | 7/2002 | Lafrate et al. | |
| 2002/0153737 A1 | 10/2002 | Fitts | |
| 2003/0111858 A1 | 6/2003 | Carter, III et al. | |
| 2004/0074939 A1 | 4/2004 | Aftanas et al. | |
| 2004/0080174 A1 | 4/2004 | Buelna | |
| 2004/0134953 A1 | 7/2004 | Perez | |
| 2005/0077747 A1 | 4/2005 | De Gaillard et al. | |
| 2006/0091170 A1 | 5/2006 | Almhil | |
| 2006/0213941 A1 | 9/2006 | Sweeney | |
| 2006/0283900 A1 | 12/2006 | Stapleton | |
| 2007/0132263 A1 | 6/2007 | Smith | |
| 2007/0170739 A1 | 7/2007 | Sims | |
| 2008/0012373 A1 | 1/2008 | Leitner | |
| 2008/0258487 A1 | 10/2008 | Leitner et al. | |
| 2008/0284190 A1 | 11/2008 | Leitner et al. | |
| 2009/0108612 A1 * | 4/2009 | Smith | 296/50 |
| 2009/0250957 A1 | 10/2009 | Leitner | |

OTHER PUBLICATIONS

Defendant's Opposition to Plaintiff's Motion for Relief from Judgment filed on Sep. 15, 2009, *E-Z Load Gate, Inc.* v. *American Moto Products, Inc.* et al, Case No. 6:07-cv-01962, U.S. District Court, Middle District of Florida, filed Oct. 6, 2009.

Defendant's Motion for Summary Judgment, filed on Jan. 14, 2010, 89908, Inc. d/b/a *AMP Research* v. *E-Z Load Gate, Inc.*, Case No. 2:08-cv-01515, U.S. District Court, District of Nevada, filed Nov. 14, 2008.

Affidavit of Stephen Earle in Support of Defendant's Motion for Summary Judgment, filed on Jan. 14, 2010, 89908, Inc. d/b/a *AMP Research* v. *E-Z Load Gate, Inc.*, Case No. 2:08-cv-01515, U.S. District Court, District of Nevada, filed Nov. 14, 2008.

Affidavit of Floyd Jacobs in Support of Defendant's Motion for Summary Judgment, filed on Jan. 14, 2010, 89908, Inc. d/b/a *AMP Research* v. *E-Z Load Gate, Inc.*, Case No. 2:08-cv-01515, U.S. District Court, District of Nevada, filed Nov. 14, 2008.

Final Consent Judgment and Permanent Injunction, filed on Jan. 29, 2010, 89908, Inc., d/b/a *AMP Research* v. *E-Z Load Gate, Inc.*, Case No. 2:08-cv-01515-LDG-(PAL), U.S. District Court, District of Nevada, filed Nov. 14, 2008.

Defendant's Motion to Dismiss, alternatively, Motion to Transfer, filed on filed on Dec. 9, 2009, 89908, Inc. d/b/a *AMP Research* v. *E-Z Load Gate, Inc.*, Case No. 2:09-cv-02165-PMP-PAL; U.S. District Court, District of Nevada, filed Nov. 4, 2008.

Plaintiff's Opposition to Defendant's Motion to Dismiss, alternatively, Motion to Transfer, filed on Dec. 28, 2009, 89908, Inc. d/b/a *AMP Research* v. *E-Z Load Gate, Inc.*, Case No. 2:09-cv-02165-PMP-PAL; U.S. District Court, District of Nevada, filed Nov. 4, 2008.

Order Denying Motion to Dismiss, alternatively, Motion to Transfer, issued on Jan. 14, 2010, 89908, Inc. d/b/a *AMP Research* v. *E-Z Load Gate, Inc.*, Case No. 2:09-cv-02165-PMP-PAL; U.S. District Court, District of Nevada, filed Nov. 4, 2008.

Defendant's Motion to Dismiss or Stay Case, filed on Dec. 7, 2009, *E-Z Load Gate, Inc.* v. *89908, Inc.* d/b/a AMP Research, Case No. 2009-CA-9453-15-K, Circuit Court Eighteenth Judicial Circuit, Seminole County, Florida, filed Nov. 10, 2009.

Summons and Complaint, *E-Z Load Gate, Inc.* v. *89908, Inc.* d/b/a/ AMP Research, Case No. 2009-CA 94353-15-K, In the Circuit Court, Eighteenth Judicial Circuit, Seminole County, Florida, filed Nov. 10, 2009.

Complaint, 89908, Inc. d/b/a *AMP Research* v. *E-Z Load Gate, Inc.*, Case No. 2:09-cv-02165, United States District Court for the District of Nevada, filed Nov. 11, 2009.

Order Denying Motion to Enforce Judgment and Motion for Relief for Judgment, *E-Z Load Gate, Inc.* v. *American Moto Products, Inc.* et al, Case No. 6:07-cv-01962, U.S. District Court, Middle District of Florida, filed Oct. 6, 2009.

* cited by examiner

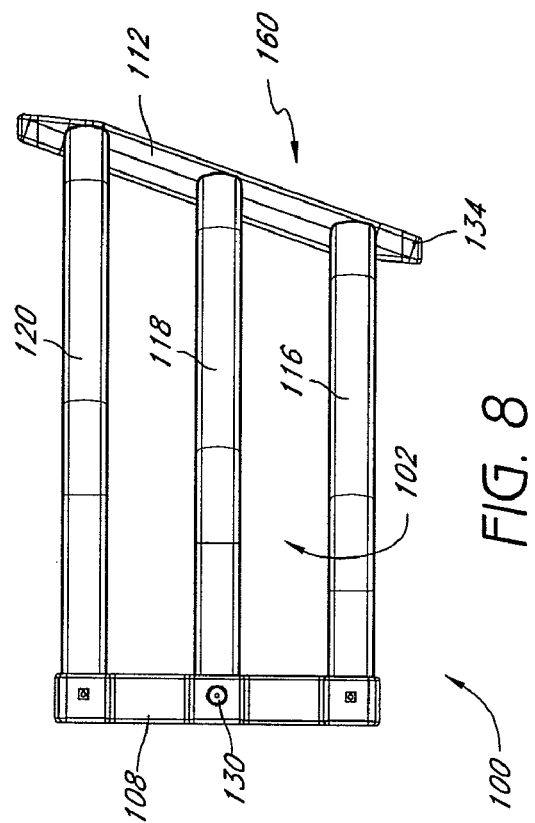
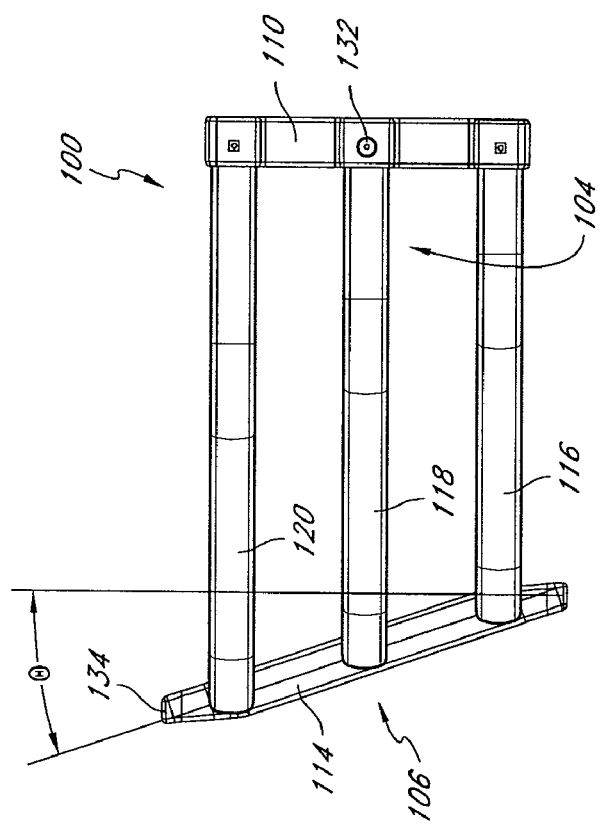

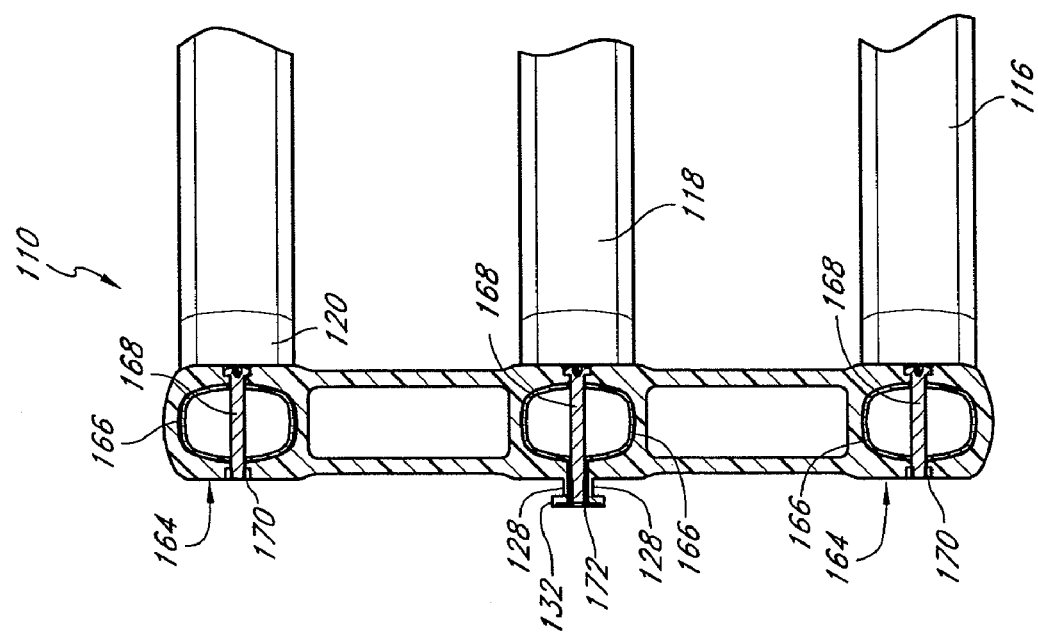

VEHICLE CARGO TAILGATE ENCLOSURE

CROSS-REFERENCE TO RELATED APPLICATIONS

This application is related to and claims priority to U.S. Provisional Patent Application No. 60/863,339, entitled "VEHICLE CARGO TAILGATE ENCLOSURE," filed on Oct. 27, 2006.

INCORPORATION BY REFERENCE

The entirety of U.S. Provisional Patent Application No. 60/863,339, filed on Oct. 27, 2006 is expressly incorporated by reference herein and made a part of the present specification.

BACKGROUND OF THE INVENTION

1. Field of the Invention

The present application generally relates to a cargo tailgate enclosure for a pickup truck.

2. Description of the Related Art

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to be adequately transferred. Unfortunately, this raises the risk that the load will fall out of the back of the truck, or that the load will need to be tied down, taking additional time.

For this reason, various truck tailgate enclosures have been developed. Despite the great success and excellent functionality of previous tailgate enclosures, new areas exist in which to further improve the cargo tailgate enclosure.

SUMMARY OF THE INVENTION

One embodiment of the present invention is an improved tailgate enclosure which preferably incorporates the use of non-circular cross-members, simplified vertical supports, and a modified storage space defined by the tailgate enclosure. In some embodiments, the new tailgate enclosure is particularly well suited for transporting motorcycles in the cargo bed of a pickup truck. The new tailgate enclosure can also desirably provide simplified assembly.

In some embodiments, a vehicle tailgate enclosure for use with a vehicle having an open storage bed is provided. The open storage bed has a rear end, a first upstanding side panel to on one side of said bed, a second upstanding side panel to on an opposite side of said bed, and a tailgate. The tailgate enclosure is mountable in a first position in which said tailgate enclosure comprises a first side wall, a second side wall, and a connecting wall. The first side wall is coupled to the first side panel. The second side wall is coupled to the second side panel. The connecting wall connects said first side wall and said second side wall, a portion of said connecting wall positioned over said tailgate rearward of said rear end of said bed, said connecting wall angling upward and outward from said tailgate at an angle of between about 10 and about 50 degrees from vertical.

In other embodiments, a vehicle tailgate enclosure for use with a vehicle having an open storage bed is disclosed. The storage bed has a rear end, a first upstanding side panel defining one side of said bed, a second upstanding side panel defining an opposite side of said bed, and a tailgate. The tailgate enclosure is mountable in a first position in which said tailgate enclosure comprises a first side wall, a second side wall, and a connecting wall. The first side wall is coupled to the first side panel. The second side wall is coupled to the second side panel. The connecting wall connects said first side wall and said second side wall. The connecting wall comprises a plurality of cross-members having a non-circular cross-section; and a plurality of struts, each strut defining a plurality of openings, each of said plurality of openings sized and shaped to receive and retain one of said plurality of cross-members.

BRIEF DESCRIPTION OF THE DRAWINGS

These and other features, aspects and advantages of the present vehicle cargo tailgate enclosure are described below with reference to drawings of preferred embodiments, which are intended to illustrate, but not to limit, the present invention. The drawings contain twenty-three figures.

FIG. 7 is a right side view of the truck tailgate enclosure of FIG. 1.

FIG. 8 is a left side view of the truck tailgate enclosure of FIG. 1.

FIG. 16 is a cross-sectional view of a pivot upright of the truck tailgate enclosure of FIG. 1.

DETAILED DESCRIPTION OF THE PREFERRED EMBODIMENT

Several embodiments of vehicle cargo tailgate enclosures are described herein. With reference to many of the figures, relative directions and positions are used such as top, bottom, front, back, left, and right. With reference to the tailgate enclosure, the direction convention follows corresponding to a vehicle with the tailgate enclosure in the position shown in FIG. 1. That is, the left side of the cargo tailgate enclosure corresponds to the left side of the vehicle and the top of the tailgate enclosure corresponds to the top of the vehicle all from the orientation of a person sitting in the driver's seat. This direction convention will be carried with the tailgate enclosure throughout different positions which may shift the relative front, back, top, and bottom of the tailgate enclosure relative to the vehicle. This direction convention is only intended to clarify the description and is in no way intended to limit the scope of the technology, unless otherwise expressly stated.

Figure 1:
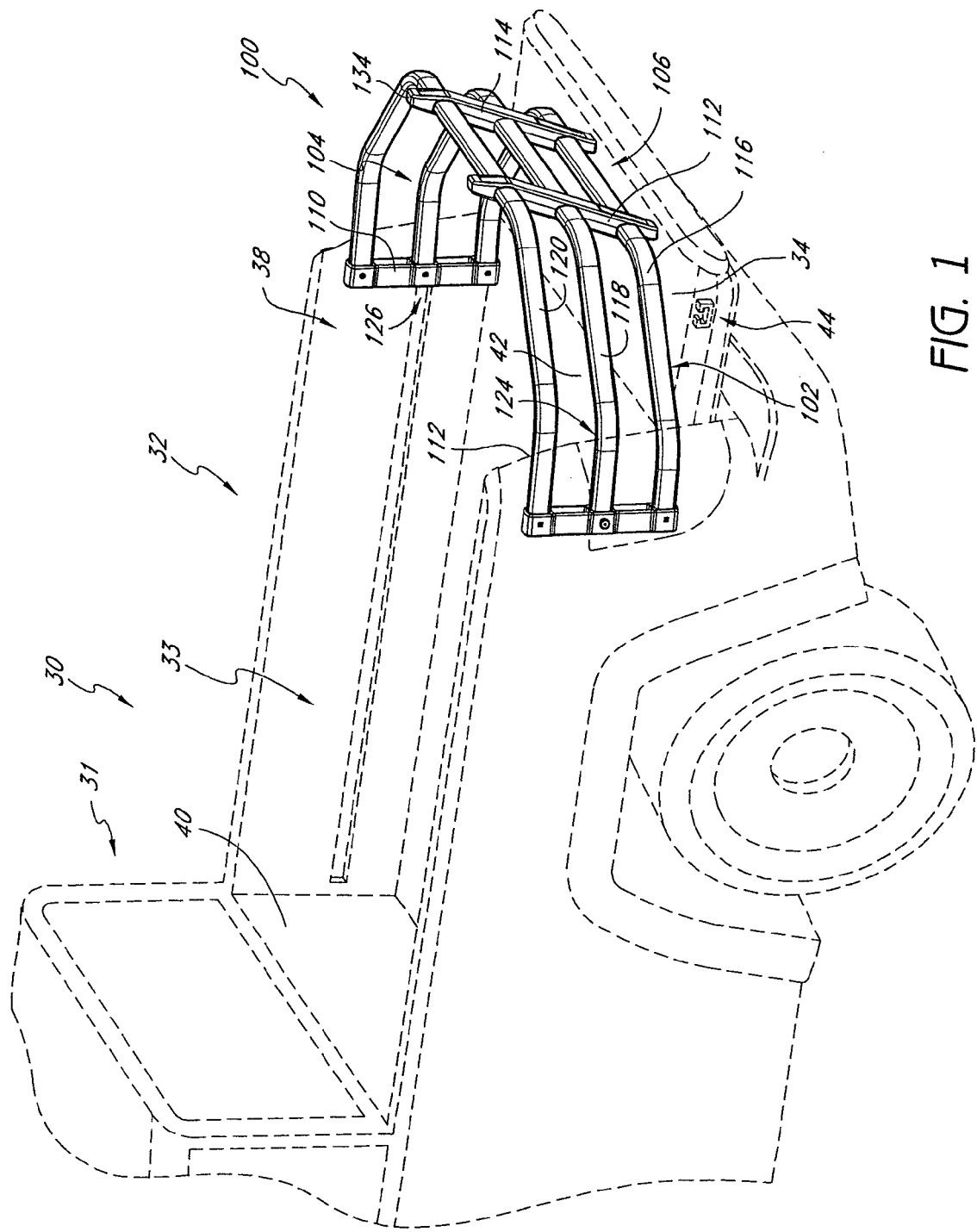
FIG. 1 is a perspective view of an embodiment of a truck tailgate enclosure mounted on a truck over the tailgate.
Figure 2:
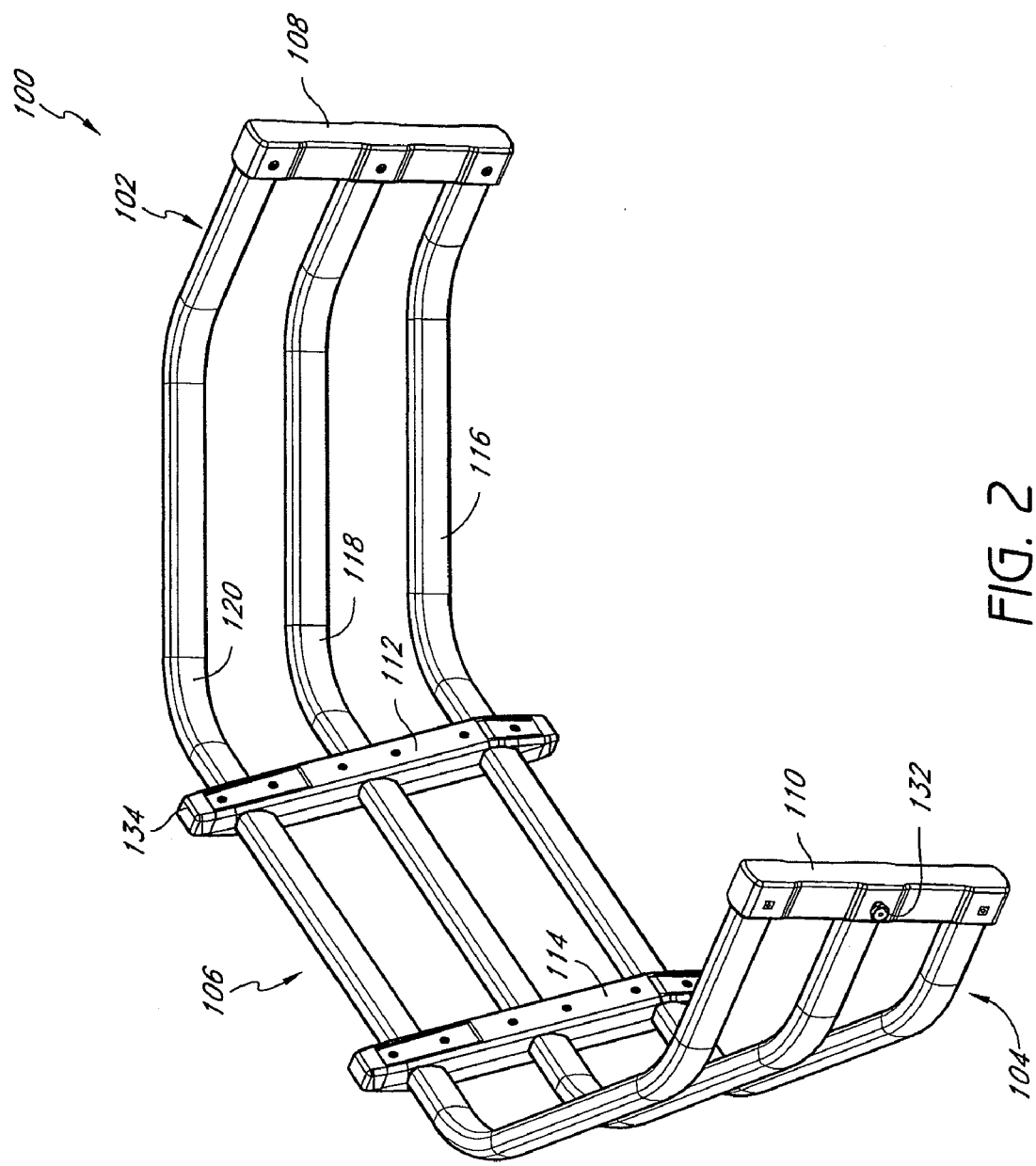
FIG. 2 is a perspective view of the truck tailgate enclosure of FIG. 1.

FIG. 1 illustrates a cargo tailgate enclosure 100 mounted to a truck 30. The truck 30 comprises a cab 31 to the rear of which is a cargo bed 32. The cargo bed 32 includes a front wall 40, right side wall 36, left side wall 38, and a tailgate 34 which together define a cargo space 33. The cargo tailgate enclosure 100 is preferably mounted to the right side wall 36 and the left side wall 38 and, in certain positions, is capable of increasing the cargo space 33 or partitioning the cargo space 33. The walls 36, 38, 40, and the tailgate 34 are desirably upstanding panels which define a generally rectangular cargo space 33 which can be open from above.

With reference to FIG. 1, the tailgate 34 is capable of providing access to the cargo space 33 from a rearward location and is pivotally connected adjacent a lower surface 42 of the cargo bed 32 that defines a lower end of the cargo space 33. In other trucks to which the tailgate enclosure 100 can be applied, the tailgate 34 can be configured to be pivotally connected to the right side wall 36 or the left side wall 38. The tailgate 34 can further comprise a latch mechanism 44 configured to secure the tailgate in a closed and upright position. In the position shown in FIG. 1, the cargo tailgate enclosure 100 is extends the cargo space 33 of the cargo bed 32 when the tailgate 34 is in an open position.

With reference to FIG. 1, in its deployed position, the cargo tailgate enclosure 100 may comprise a generally U shape which, in the position illustrated in FIG. 1, is open towards the front of the truck 30. Referring to FIGS. 1-9, the cargo tailgate enclosure further comprises a left side wall 102, a right side wall 104, and a connecting wall 106. In the position illustrated in FIG. 1, the left side wall 102 extends rearward from the left side wall 36 of the truck 30 and the right side wall 104 extends rearward from the right side wall 38 of the truck 30. The connecting wall 106 can connect rearward portions of the side wall 102 and the side wall 104 and to at least partially enclose the cargo space 33 of the truck 30. The cargo tailgate enclosure 100 is desirably pivotally connected to the left side wall 36 and the right side wall 38 of the truck 30 at pivot connection 124 and pivot connection 126. The cargo tailgate enclosure 100 can be rotated about the pivot connections 124, 126.

The pivotal nature of the connections 124, 126 different configurations in which the cargo tailgate enclosure 100 can be positioned without disconnecting the cargo tailgate enclosure 100 from the side wall 36 and the side wall 38 and will be discussed in greater detail below. As will be appreciated, non-pivoting connections are also possible.

With continued reference to FIGS. 1-8, the cargo tailgate enclosure can further comprise three cross-members or tubular members including a bottom cross-member or tubular member 116, a middle cross-member or tubular member 118 and a top cross-member or tubular member 120 which at least partially form the walls 102, 104, and 106. The tailgate enclosure 100 may also comprise four vertical upright members or struts including a left pivot upright or strut 108, right pivot upright or strut 110, right rear upright or strut 112 and left rear upright or strut 114. The uprights 108, 110, 112, and 114 may be configured to secure the cross-members or tubular members 116, 118, and 120 in an evenly spaced configuration. The spacing between the cross-members or tubular members 116, 118, and 120 is preferably configured so that the height of walls 102, 104, and 106 of the cargo tailgate enclosure 100 is similar to the depth of the cargo space 33 of the truck 30.

The tubular members 116, 118, and 120 can desirably be made of a metallic material such as 6061-T6 Aluminum or stainless steel and the uprights can desirably be made of a high strength plastic material. Although the above mentioned materials can desirably be used, other such materials can be used in other embodiments of tailgate enclosure. For example, the tubular members 116, 118, and 120 can be made of plastic or metallic materials and the uprights 108, 110, 112, and 114 can be made of billet aluminum or a composite such as carbon fiber. As and alternate to tubular members, cross-members formed of solid or hollow shapes include such shapes as solid L-angles, L-shaped tubing, I-beams, I-shaped tubing, octagonal tubing, round tubing, square solid bars, square tubing, triangular solid bars, triangular tubing or other suitable shapes. Furthermore, the tubular members 116, 118, and 120 can be made of any suitable material such as plastic, composites, steel, or aluminum.

Although the embodiment of the cargo tailgate enclosure 100 shown in FIGS. 1-8 has been illustrated with three tubular members 116, 118, and 120, any number of tubular members may be used in the cargo tailgate enclosure 100. For example a tailgate enclosure 100 may include 2, 4, or 5 tubular members. Because a tailgate enclosure with a greater number of tubular members may in turn have a smaller spacing between the bars, it may be useful for carrying cargo that is relatively small and may be at risk of slipping between the tubular members. The same applies to the vertical uprights in that any number or spacing of vertical uprights may be used with the cargo tailgate enclosure 100. Once again a greater number of vertical uprights can be desirable depending on the preferred cargo to be carried.

One advantage of the spacing of the tubular members 116, 118, and 120 is that it provides passageways for air to pass through the walls 102, 104 and 106 of the cargo tailgate enclosure 100. Quite often when a vehicle, such as the truck 30 of FIG. 1, is traveling at high speeds the tailgate 34 can provide a great deal of wind resistance when in an upright positions. With the spaced positioning of the tubular members 116, 118, and 120 shown in FIGS. 1-8 air may pass freely through cargo tailgate enclosure 100, which reduces unnecessary wind drag on the truck 30.

With reference to FIGS. 7 and 8, the cargo tailgate enclosure further comprises a rearwardly sloping back wall 106. The back wall 106 is configured to slope upward and outward relative to a rear end of the tailgate 34. The rearward angle θ of the back wall 106 from vertical is preferably at least 10 degrees and desirably at least 15 degrees. In one embodiment, the angle, θ is approximately 19.1 degrees. Furthermore, the angle θ of the back wall 106 can preferably be no greater than about 50 degrees and desirably no greater than 45 degrees and more preferably no greater than 30 degrees. Furthermore the range of the angle θ in some embodiments is desirably between 10 degrees and 50 degrees and preferably between 15 degrees and 45 degrees and more desirably between 15 degrees and 30 degrees. The benefits and advantages of the sloped back wall 106 will be discussed in further detail below with reference to various positions of the tailgate enclosure 100.

Figure 5:
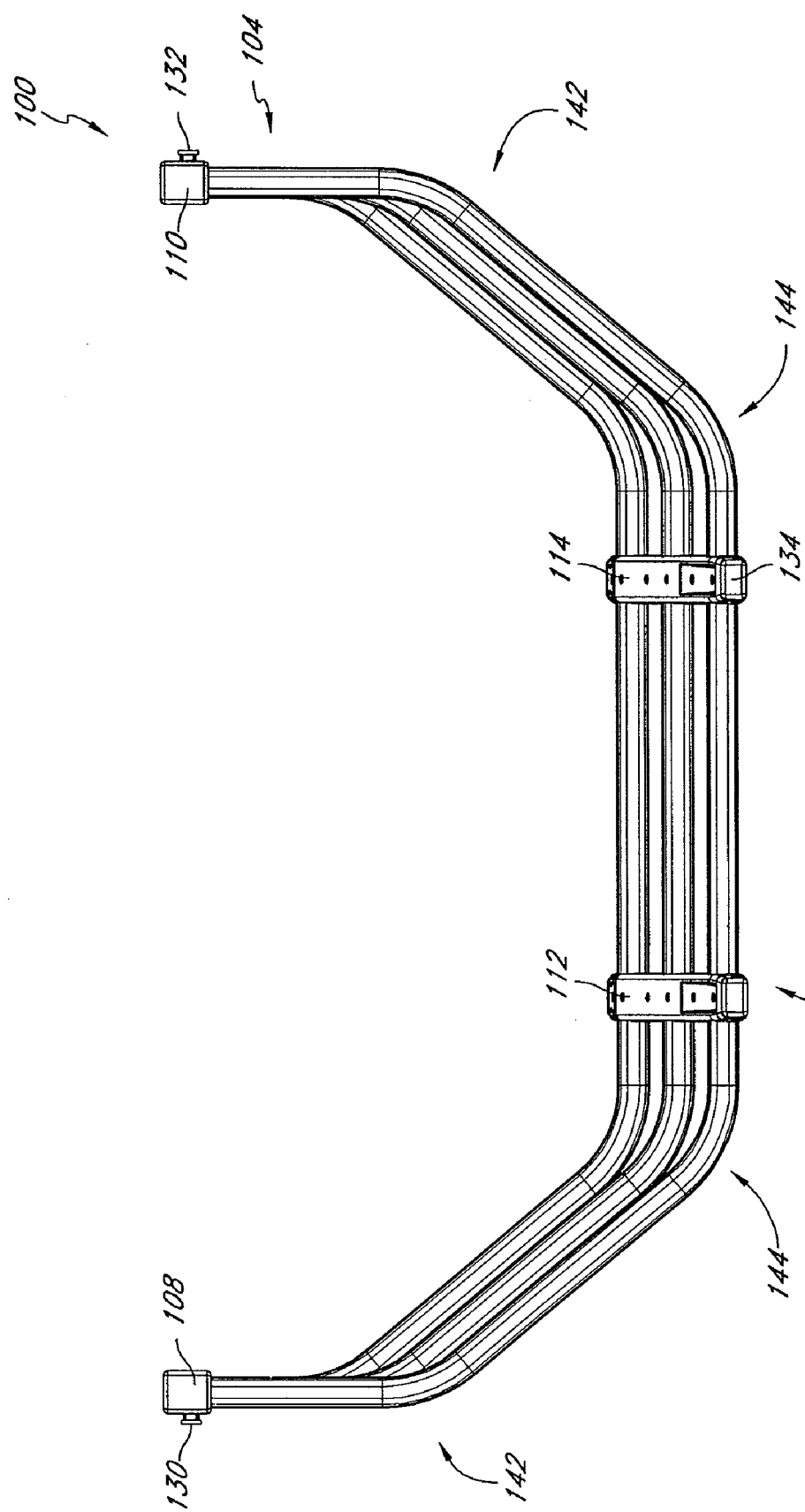
FIG. 5 is a top view of the truck tailgate enclosure of FIG. 1.
Figure 6:
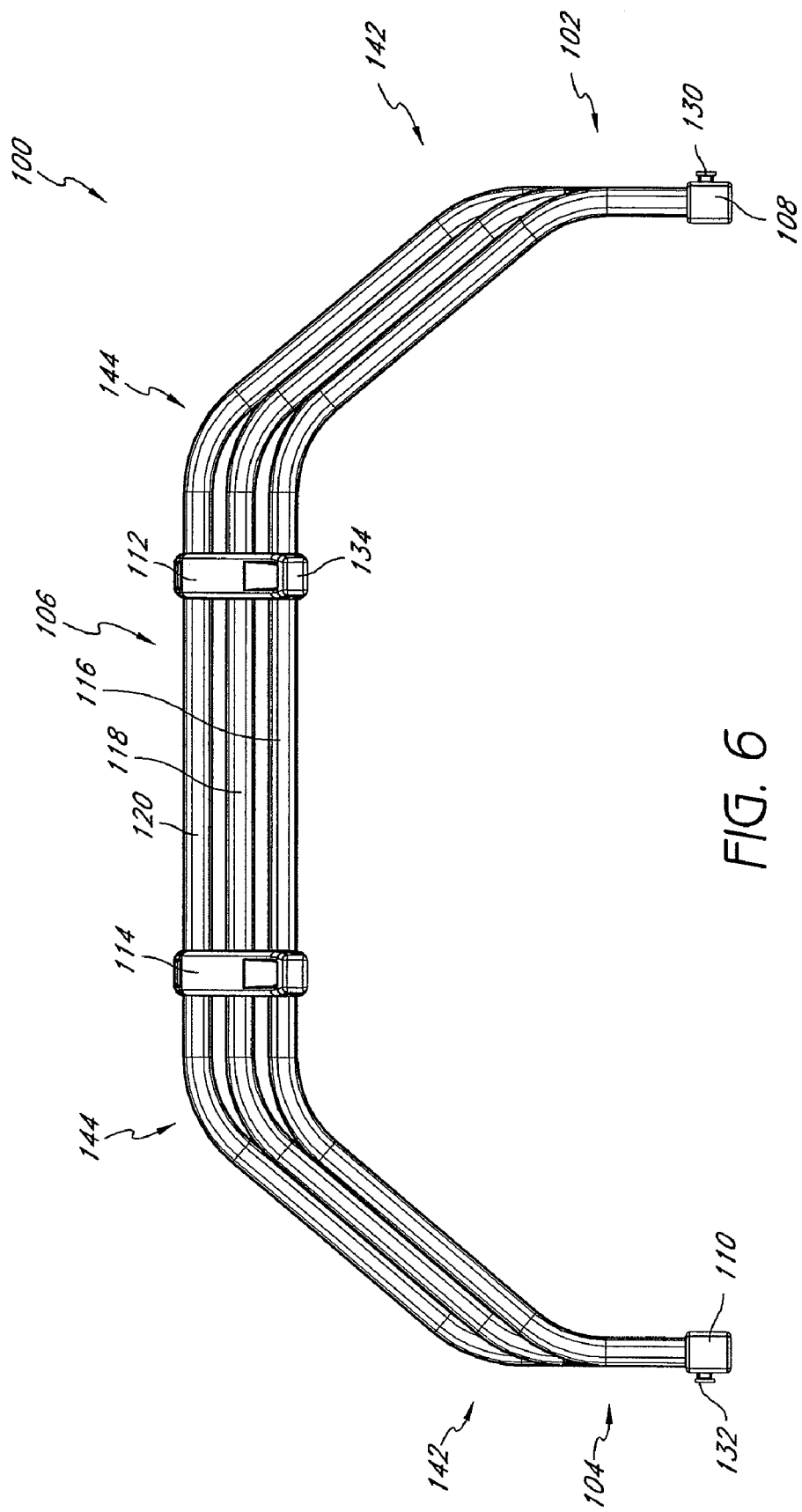
FIG. 6 is a bottom view of the truck tailgate enclosure of FIG. 1.

With reference to FIGS. 5 and 6, the walls 102, 104, and 106 are preferably formed at least in part by the tubular members 116, 118, and 120. In order to transition between the side walls 102 and 104 to the back wall 106, the tubular members 116, 118, and 120 can be bent to achieve the transitions. In one embodiment, the tubular members 116, 118, and 120 can have two bend locations on each side of the cargo tailgate enclosure 100 including two forward bent transitions 142 and two rearward bent transitions 144. Although the illustrated embodiment shows two bent transitions 142 and 144 any number of bent transitions may be used including one or three. As used herein, "bent" is a broad term, and is in reference to the end configuration, not the manufacturing process. Thus, a carbon fiber tubular member that is laid up originally with a bend in it would be considered bent.

In some embodiments, the tubular members 116, 118, and 120 are formed of multiple pieces such that the tubular members 116, 118, and 120 are formed of two L-shaped pieces which can connect along the back wall 106. Such a configuration can reduce the size of the tubular members 116, 118, and 120, which may increase the ease of shipping and/or storing the cargo tailgate enclosure 100. Furthermore, because the tubular members 116, 118, and 120 are preferably made of two L-shaped pieces, the tubular members 116, 118, and 120 can provide a degree of adjustment to adjust the overall width of the cargo tailgate enclosure 100. Such an adjustment can be advantageous to accommodate for dimensional tolerances in various vehicles or in the cargo tailgate enclosure 100. Although the embodiment of the tailgate enclosure shown in FIGS. 1-8 has been shown with the tubular members 116, 118, and 120 comprising two L-shaped pieces, the tubular members 116, 118, and 120 can comprise any number of pieces including being formed of one solid piece.

With continued reference to FIGS. 1-8, the left upright 108 and the right upright 110 may be configured to substantially cap open distal ends of the tubular members 116, 118, and 120. The right upright 110 and the left upright 108 are further configured to include a left pivot mount 130 and a pivot mount 132 which are configured to secure the cargo tailgate enclosure 100 to the left side wall 36 and the right side wall 38 of the truck 30. Preferably, the left pivotal mount 130 and the right pivotal mount 132 are received by latches 202, illustrated in FIGS. 17-20 which may be mounted to an inner surface of the side wall 36 and 38. The details of the connection between the pivotal mounts 130 and 132 and the latches 202 will be discussed in greater detail below.

With continued reference to FIGS. 1-8, in some embodiments, the left rear upright 112 and the right rear upright 114 can comprise bumpers 134. The bumpers 134 are configured to support the back wall 106 of the cargo tailgate enclosure 100 when the cargo tailgate enclosure is rested against the lower surface 42 of the cargo bed 32 or the tailgate 34. The bumpers 134 are desirably made of a rubber material so as to provide a soft interface between the right rear upright 114 and the left rear upright 112 and the bottom surface 42 of the cargo bed 32 or the tailgate 34.

Figure 9:
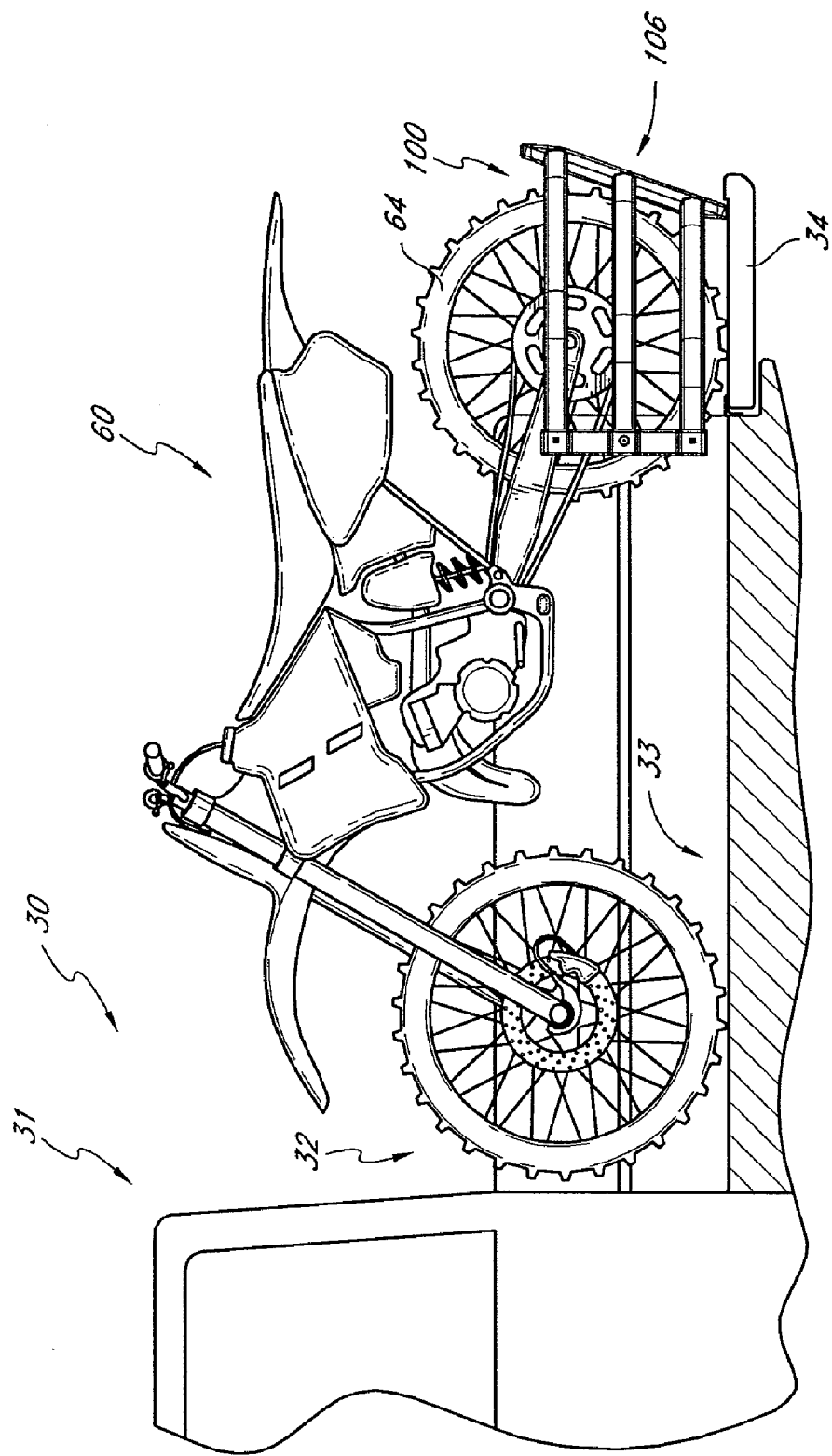
FIG. 9 is a partial cross-sectional view of a truck with the tailgate enclosure of FIG. 1 over the tailgate.

FIG. 9 illustrates the cargo tailgate enclosure 100 arranged in a first position in which the cargo tailgate enclosure 100 extends upward and outward away from the tailgate 34 and increases the size of the cargo space 33. In this configuration, the cargo tailgate enclosure 100 provides more space for storage and transport of items, such as the motorcycle 60 illustrated in FIG. 9. In the configuration shown in FIG. 9, the sloping back wall 106 of the cargo tailgate enclosure 100 provides an advantage when transporting the motorcycle 60 in that it can provide additional space for a rear wheel 64 of the motorcycle 60 while still maintaining at least a portion of the rear wall 106 resting on the tailgate 34. This configuration is afforded by the angle of the rear wall 106 and the configuration of the rear uprights 112, and 114 which maintain the bumpers 134 in a position resting on the tailgate 34. While the illustrated configuration shows certain advantages of the tailgate enclosure 100 for transporting a motorcycle 60, it is contemplated that the additional cargo space can also be beneficial in transporting other items such as other wheeled vehicles (e.g. bicycles, all-terrain vehicles, scooters), or other cargo that would otherwise extend past the vehicle's open tailgate 34.

In certain scenarios when it is desirable to transport a motorcycle 60 in the cargo bed 32 of the truck 30, a cargo tailgate enclosure with a substantially vertical rear wall may not provide sufficient space to transport the motorcycle 60 because the rear wheel 64 may extend past a distal end of the tailgate 34. Thus, by using the cargo tailgate enclosure 100 with the sloped rear wall 106, transport and storage of the motorcycle 60 is easy and convenient.

It must also be noted that if a cargo tailgate enclosure with a vertical rear wall were to be used in a situation as illustrated in FIG. 9 the cargo space 33 would be compromised in order to provide sufficient space for an item such as the motorcycle 60. That is, if a cargo tailgate enclosure with a vertical rear wall were to be made with side walls long enough to enclose the rear wheel 64 of the motorcycle 60, a hole would be defined by the rear wall of the tailgate enclosure and a distal end of the tailgate 34 which may allow cargo to fall out of the cargo space 33. Thus, by using a sloped rear wall 106 the cargo tailgate enclosure 100 can accommodate long items such as the motorcycle 60 and still substantially enclose the cargo space 33. Although a motorcycle has been used as an example of a cargo item that extends past a distal end of an open tailgate 34, as noted above the tailgate enclosure 100 can be useful with any large, or long, cargo item.

Figure 10:
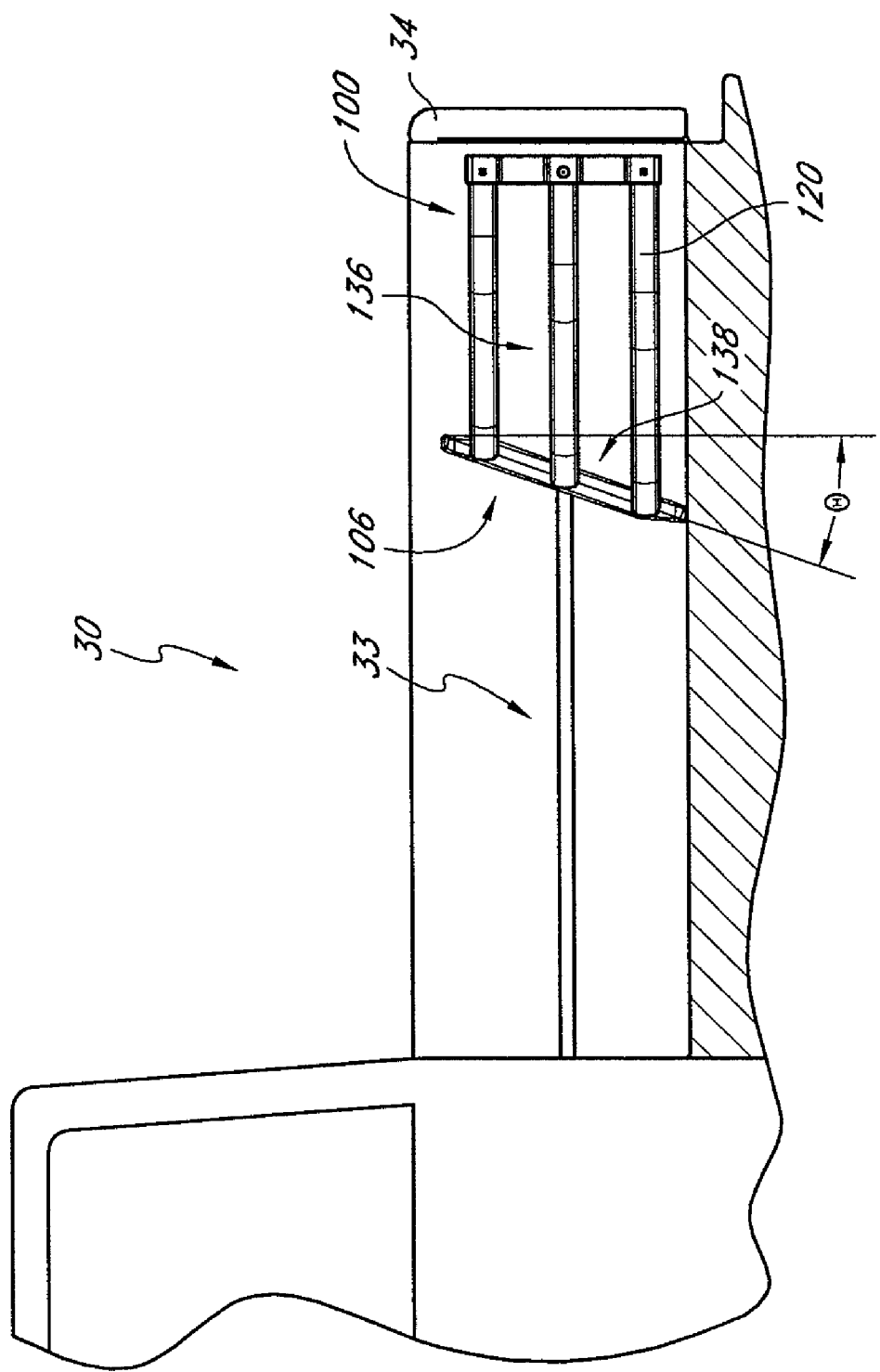
FIG. 10 is a partial cross-sectional view of a truck with the tailgate enclosure of FIG. 1 spaced forward of the closed tailgate.

FIG. 10 illustrates a second position of the cargo tailgate enclosure 100. In the position illustrated in FIG. 10, the cargo tailgate enclosure is positioned so that the tubular member 120 is closest to a lower surface 42 of the cargo bed 32. The cargo tailgate enclosure 100 is connected to the right side wall 36 and the left side wall 38 of the cargo bed 32 at the pivot connection 124 and pivotal connection 126 (FIG. 1) at a location similar to that shown in FIG. 9. In the position shown in FIG. 10, the tailgate 34 can be in an upright and closed position, and the cargo tailgate enclosure 100 can provide a storage space 136 within the cargo space 33 that is smaller than the storage space provided by the cargo bed 32. Thus, in this second position, the cargo tailgate enclosure 100 can provide a partition in the cargo space 33. The position shown in FIG. 10 can be achieved by either rotating the cargo tailgate enclosure 100 about the pivot connections 126 and 124 from the position shown in FIG. 9 or by mounting the cargo tailgate enclosure 100 directly in the position shown in FIG. 10.

The cargo space 136 provided by the cargo tailgate enclosure 100 in the second position may be advantageous when it is desirable to transport small to medium sized items. The cargo tailgate enclosure 100 can desirably provide security to transport such small and medium sized items in that it will substantially reduce the likelihood of the items shifting throughout the entirety of the cargo space 33 during transport. The sloped rear wall 106 of the cargo tailgate enclosure further provides a subspace 138 of the cargo space 136 that is particularly well suited for storing small items because the sloped rear wall 106 provides some added security by covering the upper portion of the subspace 136. Such a space may be useful when transporting groceries or a duffle bag because a user could tuck such items into the subspace 138.

Figure 11:
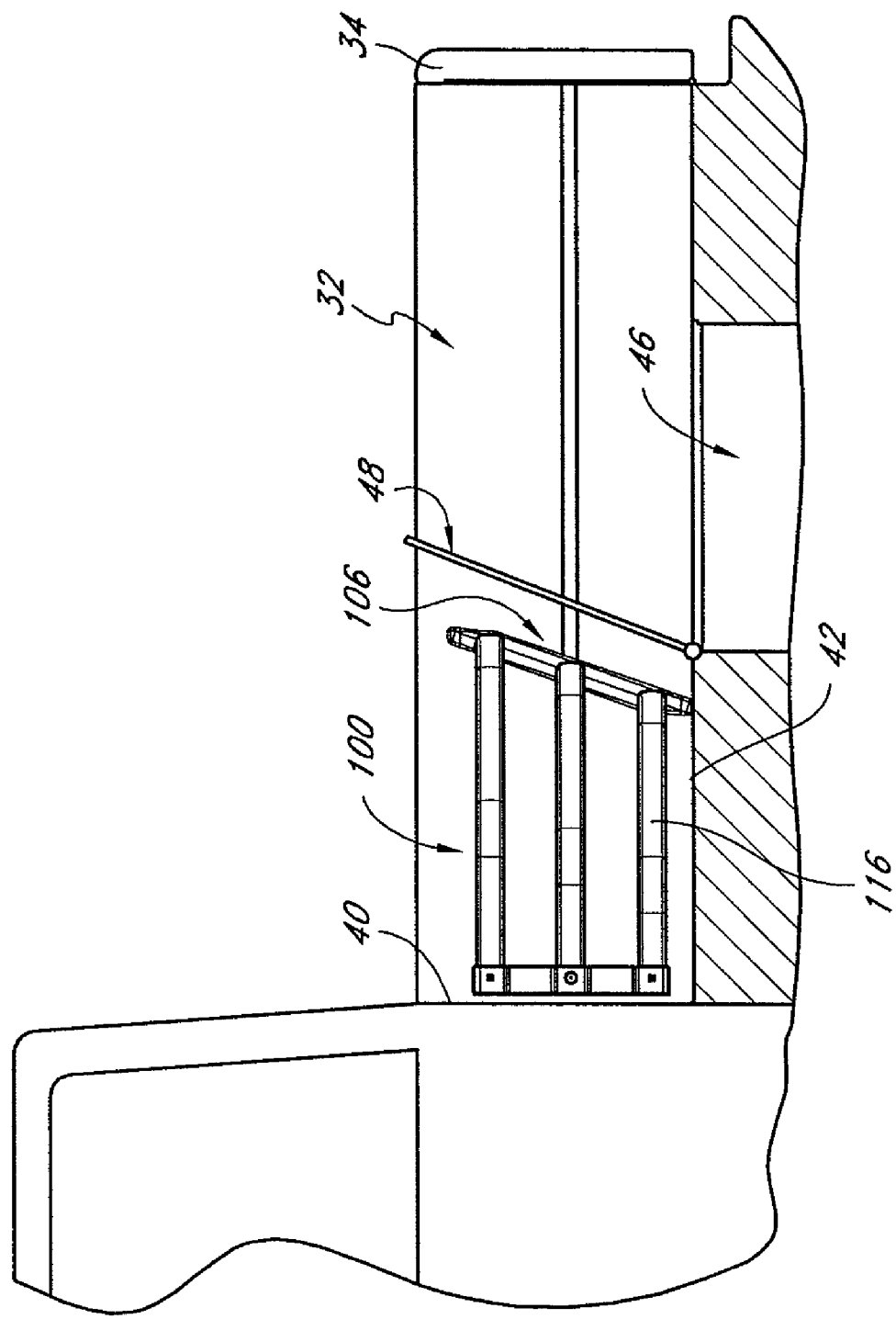
FIG. 11 is a partial cross-sectional view of a truck with the truck tailgate enclosure of FIG. 1 behind the truck cab.

FIG. 11 illustrates a third position of the cargo tailgate enclosure 100 in which the cargo tailgate enclosure 100 is located near the front wall 40 of the cargo bed 32. The cargo tailgate enclosure 100 is positioned so that the tube 116 is located closest to the lower surface 42 of the cargo bed 32, and the uprights 108 and 10 are located closest to the front wall 40 of the cargo bed 32. In some pick-up trucks, the cargo bed 32 can include a storage box 46 located below the lower surface 42 of the cargo bed 32 which is closed by a lid 48. The lid 48 is preferably pivotally connected to the lower surface 42 of the cargo bed 32. The sloped rear wall 106 of the cargo tailgate enclosure 100 is advantageous in this position in that it can allow the lid 48 to be opened while the cargo tailgate enclosure 100 is in the third position. In the position shown in FIG. 11, the left upright 112 and the right upright 114 (FIG. 1) rest against the lower surface 42 of the cargo bed 32 at a position in front of the pivot end of the lid 48. Thus, the cargo tailgate enclosure 100 can allow the lid 48 to be opened provide access to the storage box 46 without repositioning or removing the cargo tailgate enclosure 100. One such storage box 46 and lid 48 configuration can be seen on a Honda Ridgeline™ truck.

Figure 12:
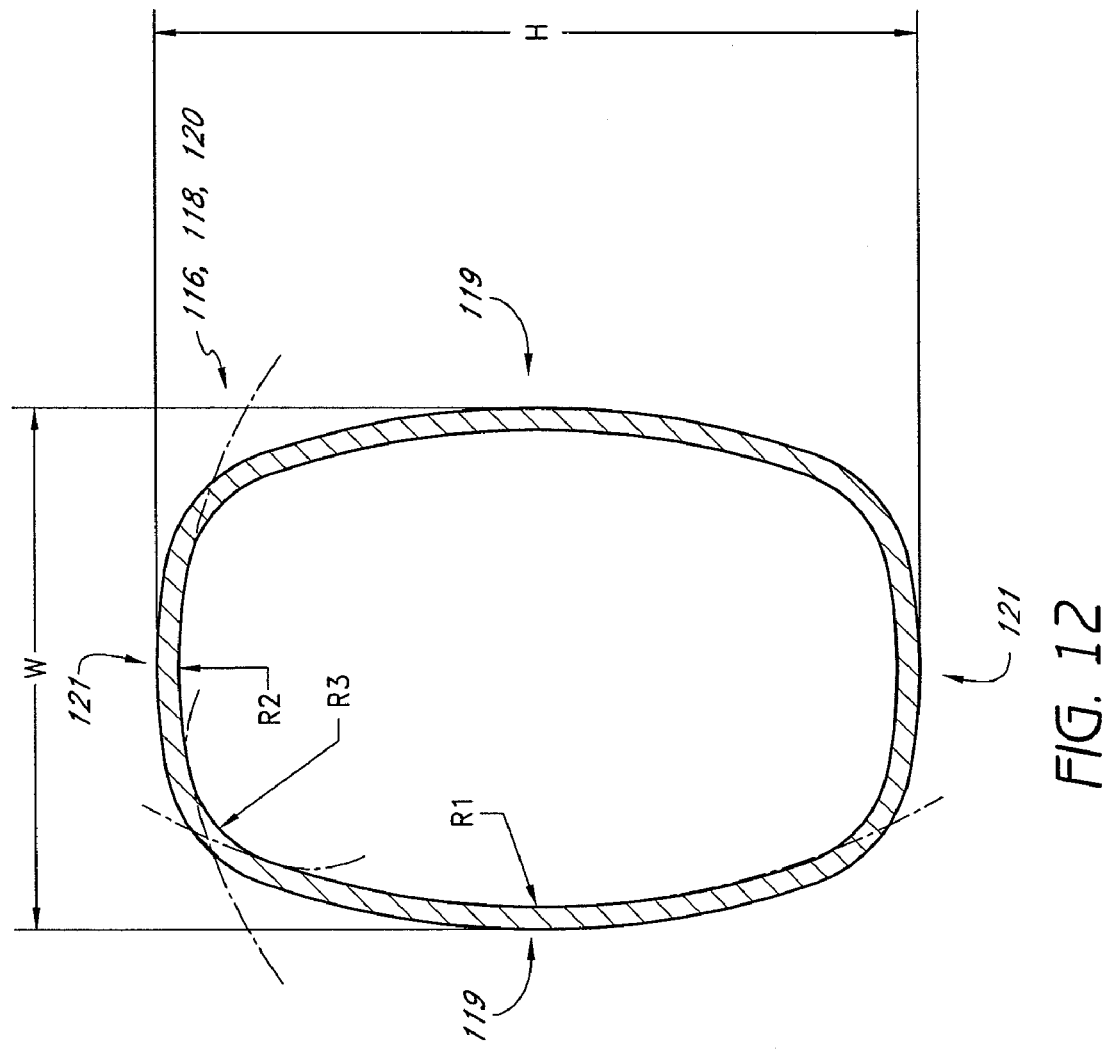
FIG. 12 is a cross-sectional view of a tubular member of the truck tailgate enclosure of FIG. 1.

FIG. 12 illustrates a cross-section of the tubular member 116, 118, and 120. The cross-section comprises a generally non-circular shape with curved end walls 121 and sidewalls 119. In the embodiment shown in FIG. 12 the average height AH of the cross-section is preferably 1.92 inches and the average width AW is preferably 1.18 inches. Furthermore, in the embodiment shown in FIG. 12 the overall Height H is preferably 2 inches and the overall width W is preferably 1.375 inches. Although this particular embodiment comprises the aforementioned dimensions, other suitable dimensions can be used. When the average height AH is 1.92 inches and the average width AW is 1.18 inches, the resultant average height to average width ratio is 1.62, which approximates a ratio commonly referred to as Fibonacci's Golden Ratio. This proportion provides an aesthetically pleasing shape to the tubular members 116, 118, and 120.

With continued reference to FIG. 12 the tubular members 116, 118, and 120 comprise a non-circular profile. In the illustrated embodiment, the tubular members 116, 118, 120 further include convex curved sides having sidewalls 119 extending generally vertically to define a height H of the tubular members 116, 118, 120 and end walls 121 extending generally horizontally to define a width W of the tubular members 116, 118, 120. The sidewalls 119 preferably comprise a radius R1 such that the ratio of the radius R1 to the height H is preferably less than 3:1. Furthermore, the ratio of the radius R1 to the height H is desirably less than 2:1, and preferably less than 1.5:1, being more preferably less than 1.15:1. In the particular embodiment shown in FIG. 12 the ratio is approximately 1.110:1. The radius R2 of the end walls 121 also comprise substantially similar ratio, however with regard to the end walls 121 the ratio of the radius R2 is compared to the width W. That is, the ratio of the radius R2 to the width W is preferably less than 3:1, and desirably less than 1.5:1, being more desirably less than 1.15:1. In the particular embodiment shown in FIG. 12 the ratio is 1.117:1.

With continued reference to FIG. 12 the curved corners 123 preferably comprise a radius R3 such that a ratio between the radius R3 and the height H is preferably greater than 1:32. Furthermore the ratio between radius R3 and the height H is preferably greater than 1:16 and desirably greater than 1:6. In the particular embodiment shown in FIG. 12 the ratio is 3:16. Although this particular embodiment comprises the aforementioned dimensions, other suitable dimensions can be used. It is however preferable to maintain the non circular cross section of the tubular members 116, 118, and 120 without creating a flat walled cross section. In the embodiment shown in FIG. 12 the radius R3 is preferably greater than ⅛ inch and desirably greater than ¼ inch. In the embodiment shown the radius R3 is ⅜ inch. Once again although specific dimensions are described above other suitable dimensions may be used.

Although the embodiment of the cargo tailgate enclosure 100 is described with cross-members or tubular members 116, 118, and 120 comprising the particular cross section shown in FIG. 12, in certain other embodiments other non-circular shapes may be used. Such alternate non-circular shapes may include, square, triangular, octagonal, or any other suitable non-circular shapes. Furthermore, the cross-members 116, 118, and 120 can, in some embodiments, comprise a solid shape. Some alternative shapes may include solid L-angle, solid I-beam, solid square shapes, or any other suitable solid or hollow shapes.

With continued reference to FIG. 12, an advantage of the cross-section shown in FIG. 12 is that when the cargo tailgate enclosure 100 is to be grasped by a user, the cross-section of the tube provides an excellent gripping shape so as to manipulate the cargo tailgate enclosure 100. This is particularly advantageous over a cylindrical tube in that less force is required to grasp the tube to prevent rotation within one's hand. Such a configuration in which the shape of the tubular members 116, 118, and 120 may be particularly useful is that shown in FIG. 18. When the tailgate enclosure is to be attached to the truck 30 from a position in which the tailgate enclosure 100 is in a generally horizontal position, the non-circular shape of the tubular members 116, 118, and 120 can provide an excellent grasping surface in which the tailgate enclosure 100 can be manipulated. That is, that shape of the tubular members 116, 118, and 120 allows the user to easily handle the tailgate enclosure 100 without the tubular members 116, 118, and 120 twisting in ones hands.

As discussed above with reference to FIG. 5, in some embodiments, the cargo tailgate enclosure 100 can include two sets of bent transitions: a forward set of bent transitions 142, and a rearward set of bent transitions 144. The bent transitions 142, 144 are configured to transition the side walls 102 and 104 into the rear wall 106 of the cargo tailgate enclosure 100. In the illustrated embodiment, it is desirable to bend the tubular members 116, 118, and 120 in order to achieve the angled transition 142 and 144. Thus, an advantage of the cross section of the tubular members 116, 118, and 120 is that the shape described above with respect to FIG. 12 can bend to accommodate the bends 142, 144 of the cargo enclosure 100 without substantially buckling the tubular members 116, 118, 120. If the tubular members 116, 118, and 120 were to be made with a sharp rectangular cross section, the bending of the tubular member could possibly result in bucking or dimpling of the tubular members 116, 118, and 120. Thus, the cross sectional shape of the tubular member 116, 118, and 120 illustrated in FIG. 12 provides a smooth bend when the tubular member 116, 118, and 120 are to be bent to form the angled transitions 142 and 144.

With continued reference to FIG. 12, another advantage of the non-circular tubular members 116, 118, and 120 is that the tubular members 116, 118, and 120 can be rotationally secured in the uprights 108, 110, 112 and 114. As further discussed below, the uprights 108, 110, 112 and 114 can include receiving recesses shaped to receive the non-circular tubular members 116, 118, 120 such that the tubular members are substantially restrained from rotating. This restraining feature of the uprights 108, 110, 112, 114 can be particularly advantageous with a cargo enclosure 100 comprising a sloped back wall 106. Due to the sloped back wall 106, a predetermined alignment of the tubular members 116, 118, and 120 within the uprights 112 and 114 is desirable. Thus, by using non-circular tubular members 116, 118, and 120, a desired orientation of the tubular members 116, 118, and 120 within the uprights 112 and 114 can be maintained by corresponding recesses in the uprights 112 and 114. That is, the angle of formation of the recesses in the uprights 112 and 114 can dictate the angle of the uprights 112 114 relative to the tubular members 116, 118, 120.

Advantageously, the use of non-circular tubular members 116, 118, 120 the cargo enclosure 100 can reduce assembly complexity, time, equipment, and expenses. The alignment of cylindrical tubular members relative to the uprights 112 and 114 can be particularly difficult if one were to assemble the cargo tailgate enclosure 100 without the use of a special alignment jig. In assembly of a cargo enclosure 100 with cylindrical tubular members, an alignment jig would be preferably used to align the tubes before the uprights were secured to the tubular members. However, a cargo enclosure 100 including tubular members with a non-circular cross-sectional profile, the tubular members 116, 118, 120 can be secured to the uprights 112 and 114 without the use of a special jig because the shape of the tubular members 116, 118, 120 will align with recesses in the uprights 112 and 114. Thus, this self-aligning feature of a cargo enclosure 100 with non-cylindrical tubular members 116, 118, 120 can require less time and equipment to assemble.

This assembly advantage extends further to the shipping and storage of a cargo tailgate enclosure 100 having non-cylindrical tubular members 116, 118, 120. If a special jig is required to assure proper alignment of the cargo tailgate enclosure 100, then it may be necessary to assemble the cargo tailgate enclosure at a manufacturing facility and then to box the cargo tailgate enclosure in an assembled state to ship to the customer. With the present embodiment utilizing non-circular tubes 116, 118, and 120, a jig is not required and therefore the cargo tailgate enclosure 100 can be shipped to a distributor, retail location, or an end user in a partially or completely disassembled state. The distributor, retail location, or end user can then easily assemble the cargo enclosure 100 without the use of specialized tools. The shipment of an at least partially disassembled cargo enclosure 100 can require a much smaller shipment box than that used to ship a fully assembled cargo enclosure 100. Thus, the ease of assembly afforded by the tailgate enclosure 100 may substantially reduce the cost of shipping containers and handling costs.

With returning reference to FIGS. 1-8, the tubular members 116, 118, and 120 are desirably configured so that the tubes are oriented in a vertical direction. That is, the longer portion of the cross-section of each tubular member 116, 118, and 120 is desirably oriented in a vertical direction. This orientation can provide bending resistance to loads imposed in a vertical direction. This bending resistance can be particularly advantageous if cargo (e.g., lumber) is to be loaded into the cargo bed 32 which may extend beyond the back wall 106 of the cargo tailgate enclosure 100 when the tailgate enclosure 100 is in the position shown in FIG. 9. By providing the tubular members 116, 118, and 120 to be configured in a vertical direction, the load can then easily be supported by the cargo tailgate enclosure 100. Although the illustrated embodiments show the tubular members 116, 118, and 120 having the cross-section arranged so that the longer dimension is arranged in vertical direction, any rotational arrangement of the tubing may be employed. Such alternate arrangements may include the tubular members 116, 118, and 120 being arranged so that the longer dimension of the cross section is arranged horizontally or parallel to the back wall 106, or with the longer dimension oriented at an angle between vertical and horizontal.

Figure 14A:
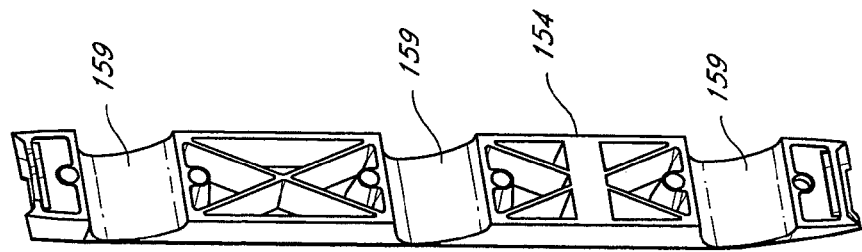
FIG. 14a is a perspective view of a mating section of a rear upright of the truck tailgate enclosure of FIG. 1.
Figure 14:
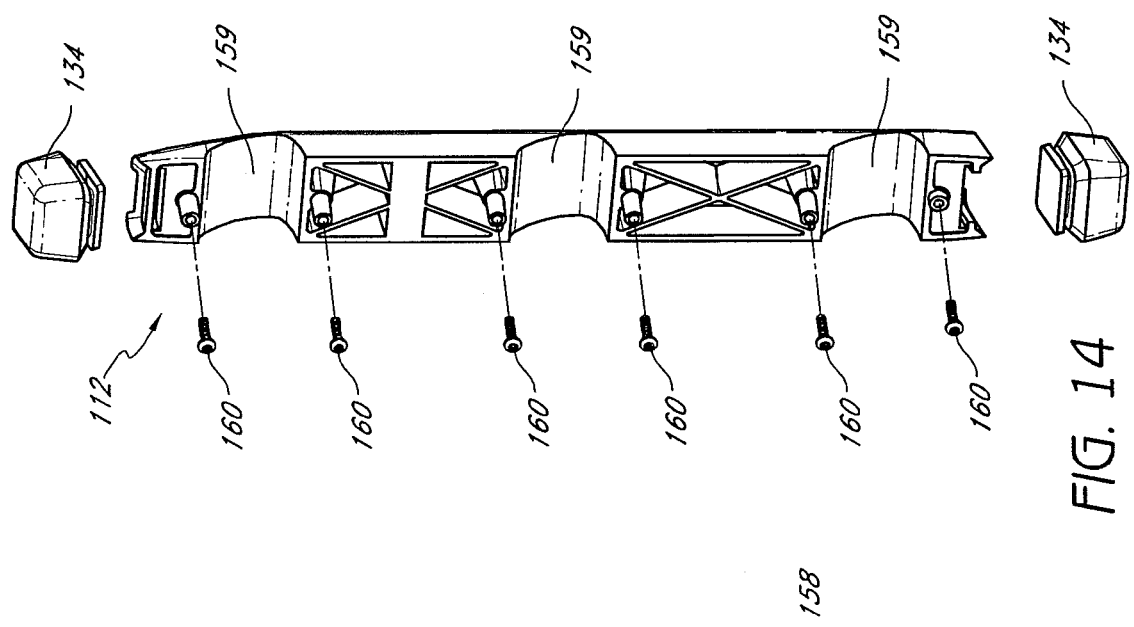
FIG. 14 is a perspective view of a section of a rear upright of the truck tailgate enclosure of FIG. 1.
Figure 13:
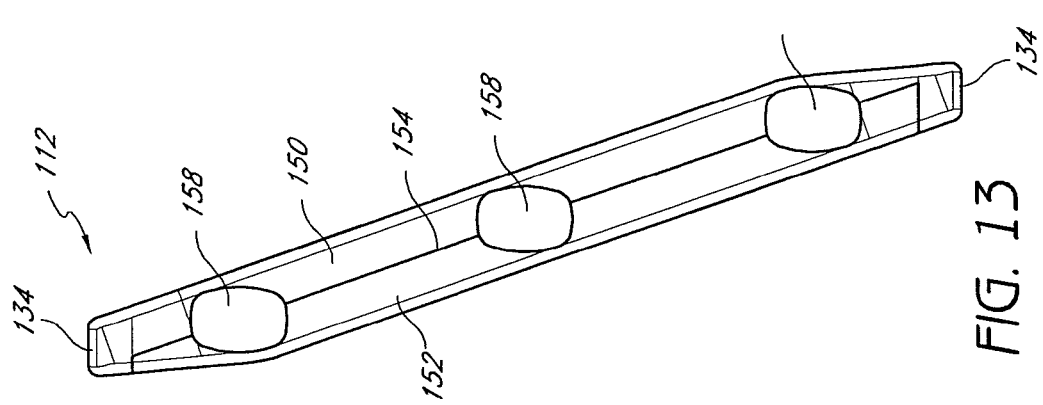
FIG. 13 is a side view of a rear upright of the truck tailgate enclosure of FIG. 1.

FIGS. 13 and 14, and 14a illustrate the left rear upright 112. In the illustrated embodiment, the left rear upright 112 is substantially similar to the right rear upright 114. The upright support 112 can be split along a split line 154 which separates the support 112 into a first shell portion 150 and a second shell portion 152. The split line 154 desirably passes diagonally through the channels 158. Preferably the split line passes through non-adjacent corners of the channel 158.

With continued reference to FIGS. 13, 14, and 14a, the left rear upright 112 can further include a bumper 134 on an upper and a lower end of the upright 112. The rubber bumpers 134 are configured to mount to the upright 112 by a tongue-and-groove arrangement. The bumper 134 can comprise a rubber material to reduce the risk of damaging the bed floor 42 or tailgate 34 when the cargo enclosure 100 is in various positions (see, e.g. FIGS. 1, 9, 10).

With continued reference to FIGS. 13, 14, and 14a, the upright 112 can further define three channels 158, each of which is configured to receive a tubular member 116, 118, 120. The first shell portion 150 and the second shell portion 152 of the support 112 are configured to separate along the split line 154 and each desirably defines a series of partial channels 159 which cooperate together to form the channels 158 to allow the tubular members 116, 118, 120 to be installed positioned in the channels 158 defined by the upright 112. In some embodiments, the first shell half 150 and the second shell half 152 are configured to be secured to one another by threaded fasteners 160 that can be received in threaded recesses in the shell halves 150, 152. As used herein "channel" is a broad term. A "full channel" may have a variety of configurations, but desirably prevents the tubular members 116, 118, 120 from moving upward, downward, frontward, and rearward.

Figure 15:
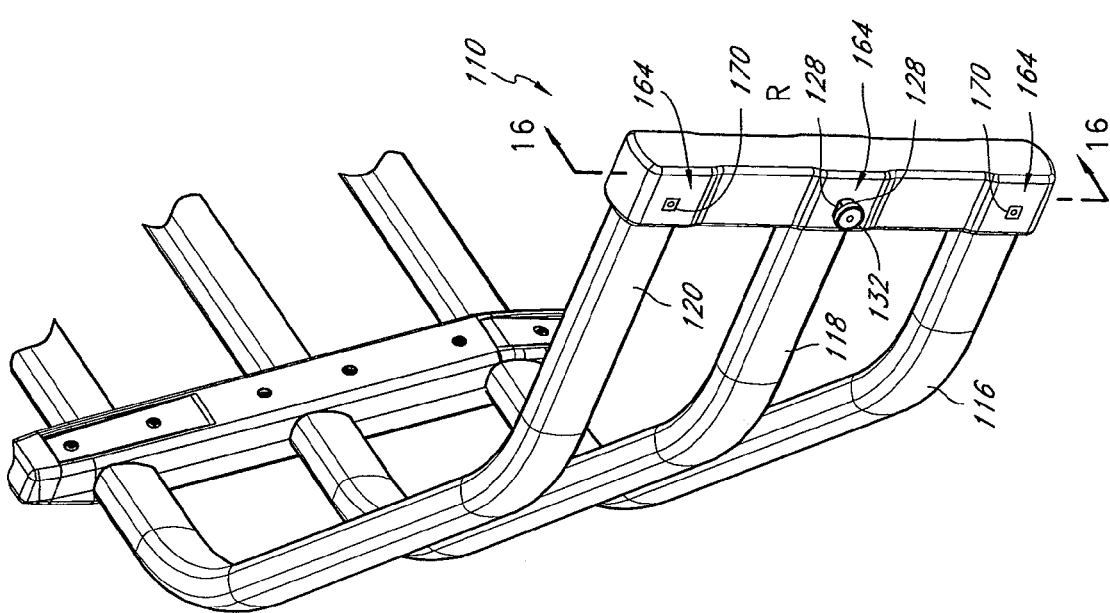
FIG. 15 is a perspective view of a pivot upright of the truck tailgate enclosure of FIG. 1.

FIGS. 15 and 16 illustrate the right pivot upright 110 which is substantially similar to the left pivot upright 108. In the illustrated embodiment, the upright 110 is configured to space apart the tubular members 116, 118, 120 and to cap the distal ends of the tubular members 116, 118, 120. The pivot upright 110 can include three enlarged portions 164 which are configured to receive an end portion of the tubular members 116, 118, 120. The enlarged portions 164 define recesses 166 which are configured to receive and cover end portions of the tubular members 116, 118, 120. The recesses 166 can desirably be closed at one end as shown in FIG. 15.

In the illustrated embodiment, the recesses 166 are further configured to receive fasteners 168, which pass through the enlarged portions 164 and through end portions of the tubular members 116, 118, and 120. The passing of the fastener through the pivot upright 110 and the tubular members 116, 118, 120, can desirably secure the tubular members to the pivot upright 110.

In some embodiments, the fasteners 168 can be 5 mm threaded screws which engage a nut 170 or T-nut 172 located on an outer face of the pivot upright 110. In the illustrated embodiment, the nuts 170 are configured to engage the top tubular member 116 and the bottom tubular member 120 and can desirably be square nuts that are counter sunk into the upright 110. This arrangement of countersunk nut 170 holds the nut 170 when the fastener 166 is tightened.

Figure 3:
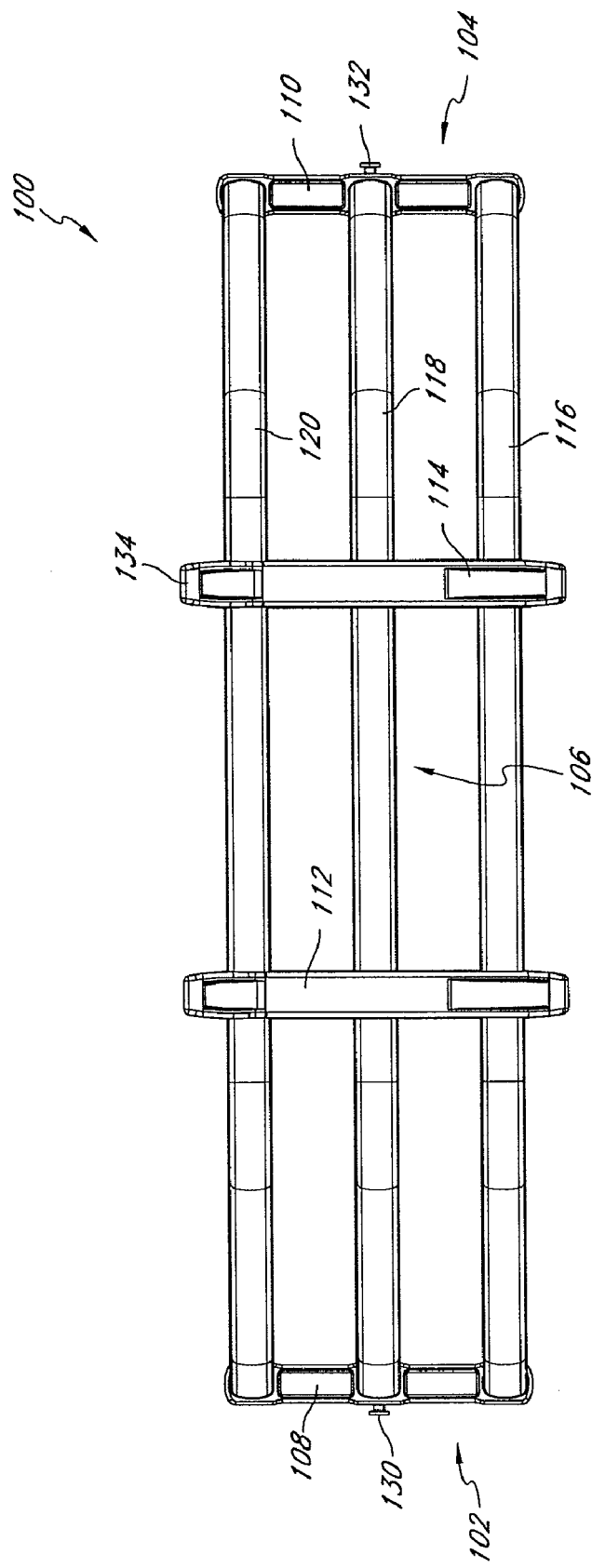
FIG. 3 is a rear view of the truck tailgate enclosure of FIG. 1.
Figure 4:
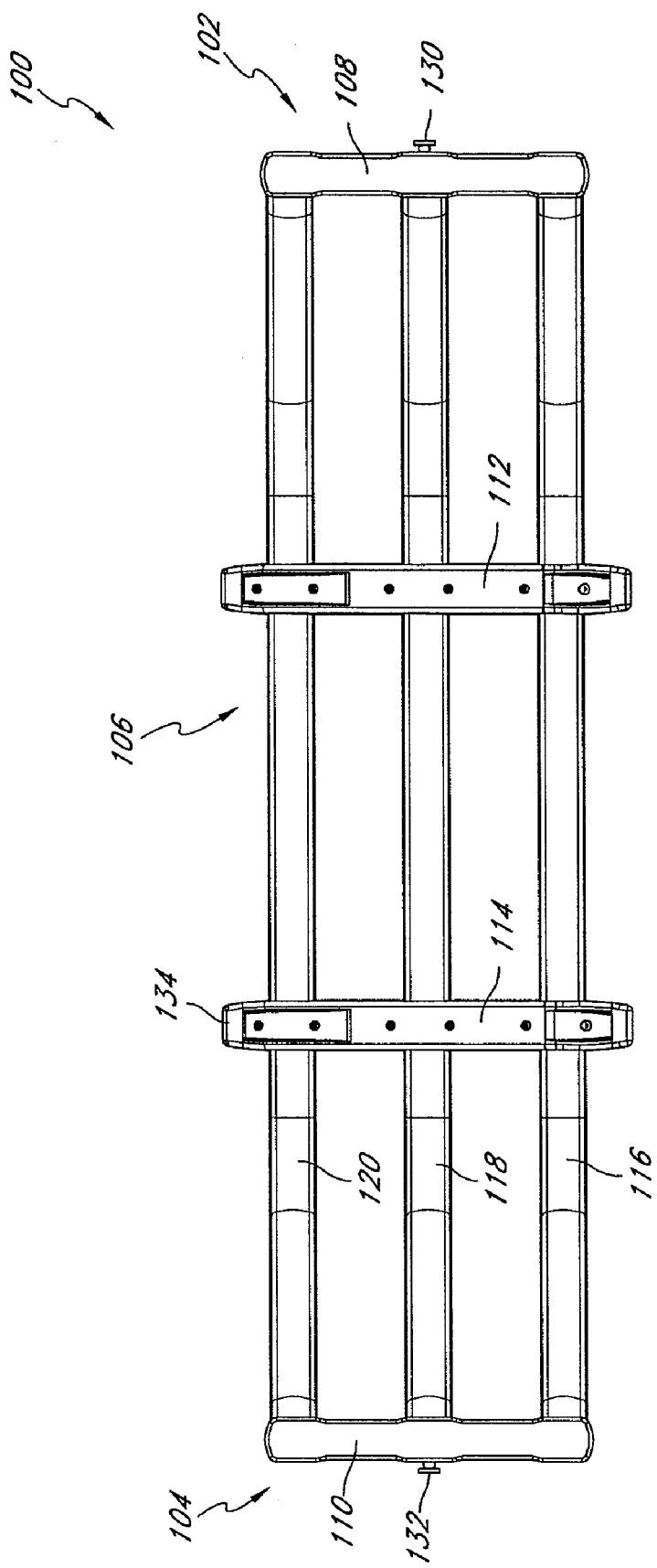
FIG. 4 is a front view of the truck tailgate enclosure of FIG. 1.

In the illustrated embodiment, the middle tubular member 118 is joined to the upright 110 by the fastener 168 and the T-nut 172 The T-nut 172 can be a flanged T-nut with spiral flutes on the body of the T-nut 172. The spiral flutes can be configured to secure the T-nut 172 into the pivot upright 110 when the fastener 168 is tightened with the nut 172. The T-nut can provide structural stability to the pivot mounts 132 and 130 (FIG. 3) which are integrally formed with the pivot uprights 110 and 112 (FIG. 3).

Although the present embodiment has been shown with threaded fasteners 168 and nuts 170 and 172 which pass through the upright 110 and 112 and the tubular members 116, 118, 120, any suitable fasteners or fastening locations can be used. For example, in some embodiments, one, some, or all of the tubular members can be riveted, adhered, or epoxied to the uprights 110, 112.

Figure 18:
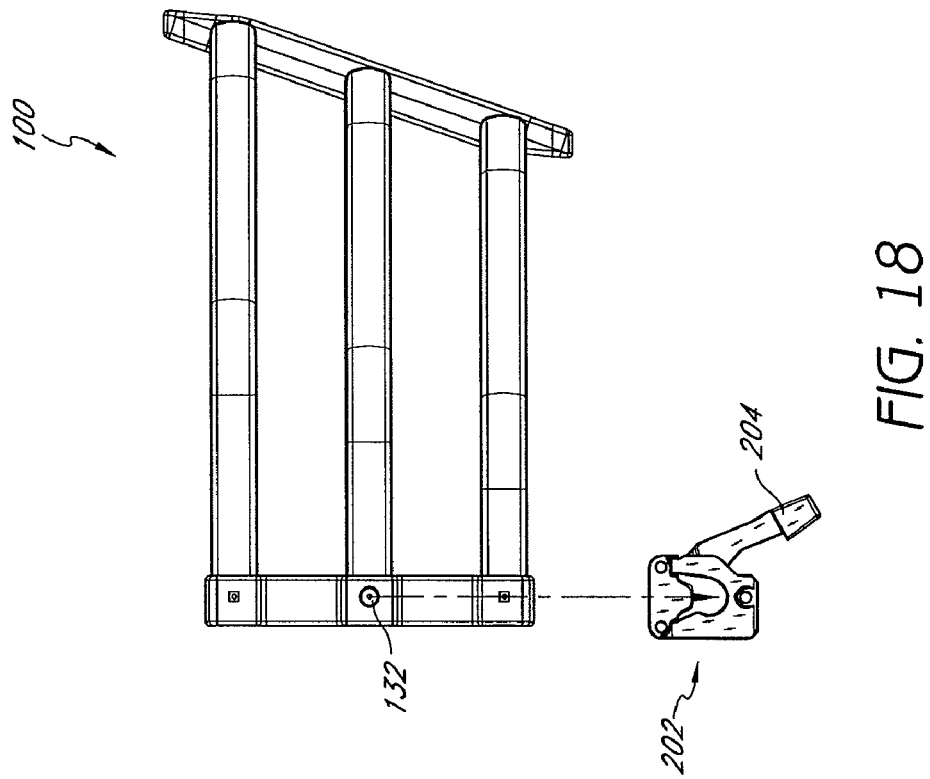
FIG. 18 is a schematic view illustrating a truck bed receiving the tailgate enclosure of FIG. 1 when the tailgate enclosure is in a horizontal orientation.
Figure 17:
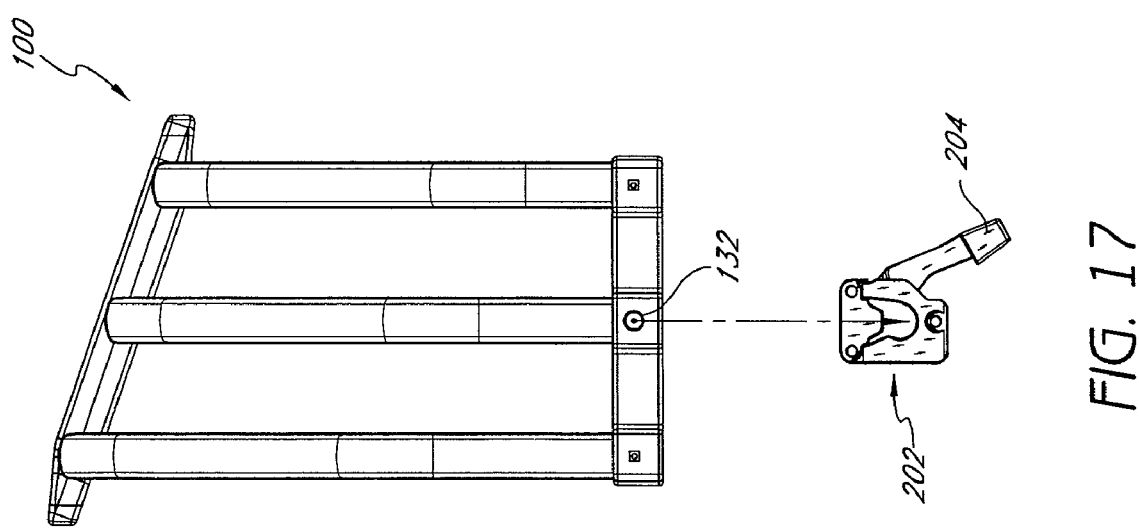
FIG. 17 is a schematic illustrating a truck bed receiving the tailgate enclosure of FIG. 1 when the tailgate enclosure is in a vertical orientation.

FIGS. 17 and 18 illustrate two alternative methods to install the cargo tailgate enclosure 100 in the truck 30 (FIG. 1). Preferably, prior to installation of the cargo tailgate enclosure 100, a latch 202 is installed on each of the side walls 36, 38 of the truck 30. The latches 202 in some embodiments can be substantially similar to the latches described in U.S. patent application Ser. No. 11/105,120, filed Apr. 13, 2005. FIGS. 17-18 illustrate a right latch 202 configured to mount to a right sidewall 38 of the vehicle bed. The cargo tailgate enclosure can have a left hand mirrored counterpart (not shown) configured to mount to the left sidewall 36 of the vehicle bed. (FIG. 1). The latches 202 are preferably installed using three threaded fasteners, however, any suitable fastening means such as a rivet, bolt, or adhesive may be used. In one embodiment, the cargo tailgate enclosure 100 includes a template which is used to locate the latches 202 on the proper location of the side wall 36 and the side wall 38 of the truck 30. Once the latches 202 are installed on the cargo bed 32 of the truck 30, the cargo tailgate enclosure 100 can then be mounted to the truck 30.

Figure 20:
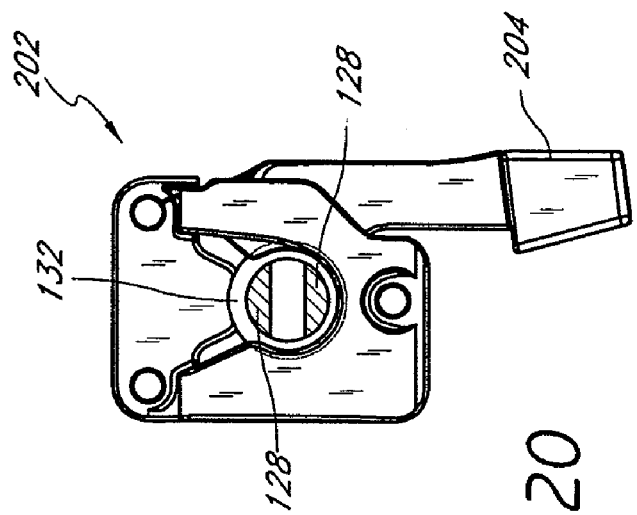
FIG. 20 is a latch which is configured to receive the truck tailgate enclosure of FIG. 1.
Figure 19:
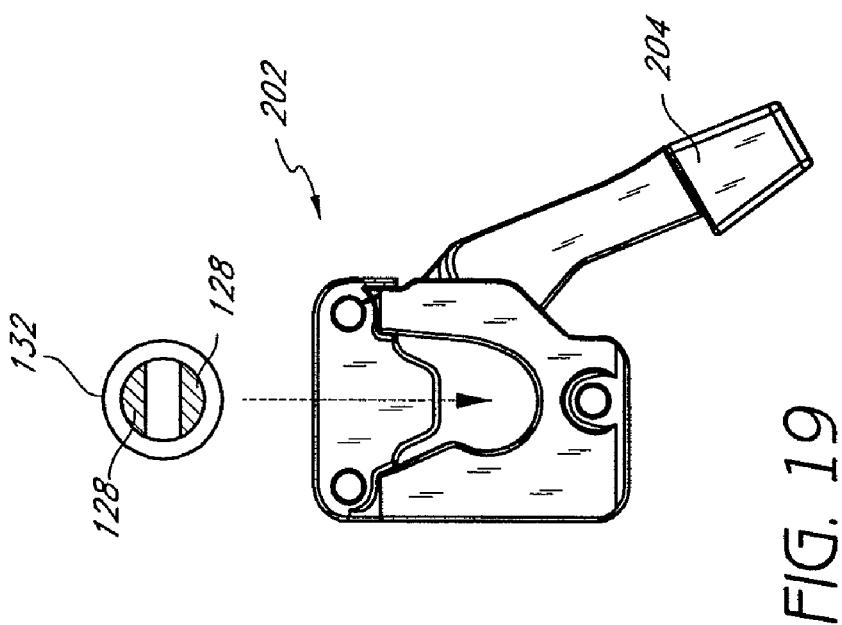
FIG. 19 is a side view of a latch configured to receive the truck tailgate enclosure of FIG. 1.

With reference to FIG. 17, one installation method shown in FIG. 17 includes positioning the cargo tailgate enclosure 100 in a substantially vertical orientation and inserting the left pivot mount 130 and the right pivot mount 132 into the latches 202. When the cargo tailgate enclosure 100 is mounted to the truck 30 using this above-mentioned method, the lever 204 of latches 202 does not require actuation into an open position. Small flats 128 can be formed in the pivot mounts 130 and 132 (FIG. 19). The flats 128 can be oriented to provide a thinner diameter of the pivot mounts 130, 132 when the cargo tailgate enclosure 100 is in a substantially vertical position (FIG. 19) as compared to when the cargo tailgate enclosure 100 is in a horizontal position (FIG. 20). Thus, the cargo tailgate enclosure 100 can be mounted to the truck 30 by placing the tailgate enclosure in a vertical position without a need to actuate the lever 204.

With reference to FIG. 18, the latches 202 can include a mechanism to allow the tailgate enclosure 100 to be mounted to the truck 30 in a substantially horizontal position as shown in FIG. 18. The mechanism includes a lever 204 coupled to a retention member. The lever 204 can be repositioned between an open position (shown in FIG. 19) of the latch 202 in which the pivot mount 132 can be freely inserted or removed into the latch 202, and a closed position in which the pivot mount 132 is rotatably secured to the latch 202. (shown in FIG. 20). This lever 204 mechanism engages the latches 202 and allows the cargo tailgate enclosure 100 to be mounted to the truck 30 in a substantially horizontal position. This is particularly advantageous when transporting a large item such as the motorcycle 60 of FIG. 9 which may block the cargo tailgate enclosure 100 from being rotated to a substantially vertical position.

Once the cargo tailgate enclosure 100 is engaged with the latches 202, it is possible to rotate the cargo tailgate enclosure 100 throughout approximately 180 degrees which allows the cargo tailgate enclosure to be placed in multiple positions including those illustrated in FIGS. 9-10 assuming it is not blocked by cargo in the bed 32. If it is desired to mount the cargo tailgate enclosure 100 in the position shown in FIG. 11, it is possible to install a second set of latches 202 on a forward portion of the cargo bed 32 of the truck 30 or it is simply possible to set the cargo tailgate enclosure 100 in the location of the cargo bed 32 shown in FIG. 11.

With reference to FIGS. 17-20, when it is desired to remove the cargo tailgate enclosure from the truck 30, the following procedures can be used. If the cargo tailgate enclosure 100 is in the substantially horizontal position, shown in FIG. 18, and cannot be rotated to a substantially vertical position, then the user must actuate the latches 202 by rotating the lever 204 which releases the pivot mount 130 or 132 from the latches 202. If the cargo tailgate enclosure 100 can be rotated to a substantially vertical position, the tailgate enclosure can simply be lifted vertically out of the latches 202 without the rotation of the lever 204 due to the flats 128.

Although the embodiment of the cargo tailgate enclosure 100 has been shown incorporating the use of the latches 202, it is contemplated that in other embodiments, any suitable latch or attachment method may be used to attach the cargo tailgate enclosure 100 to the truck 30. It is desirable that suitable attachment hardware provides a rotational degree of freedom; however, attachment hardware that do not provide a rotational degree of freedom may also be used. Also, the latches 202 or any other suitable attachment hardware can be positioned at any point along the cargo bed 32 as may be desirable by a user.

Figure 21:
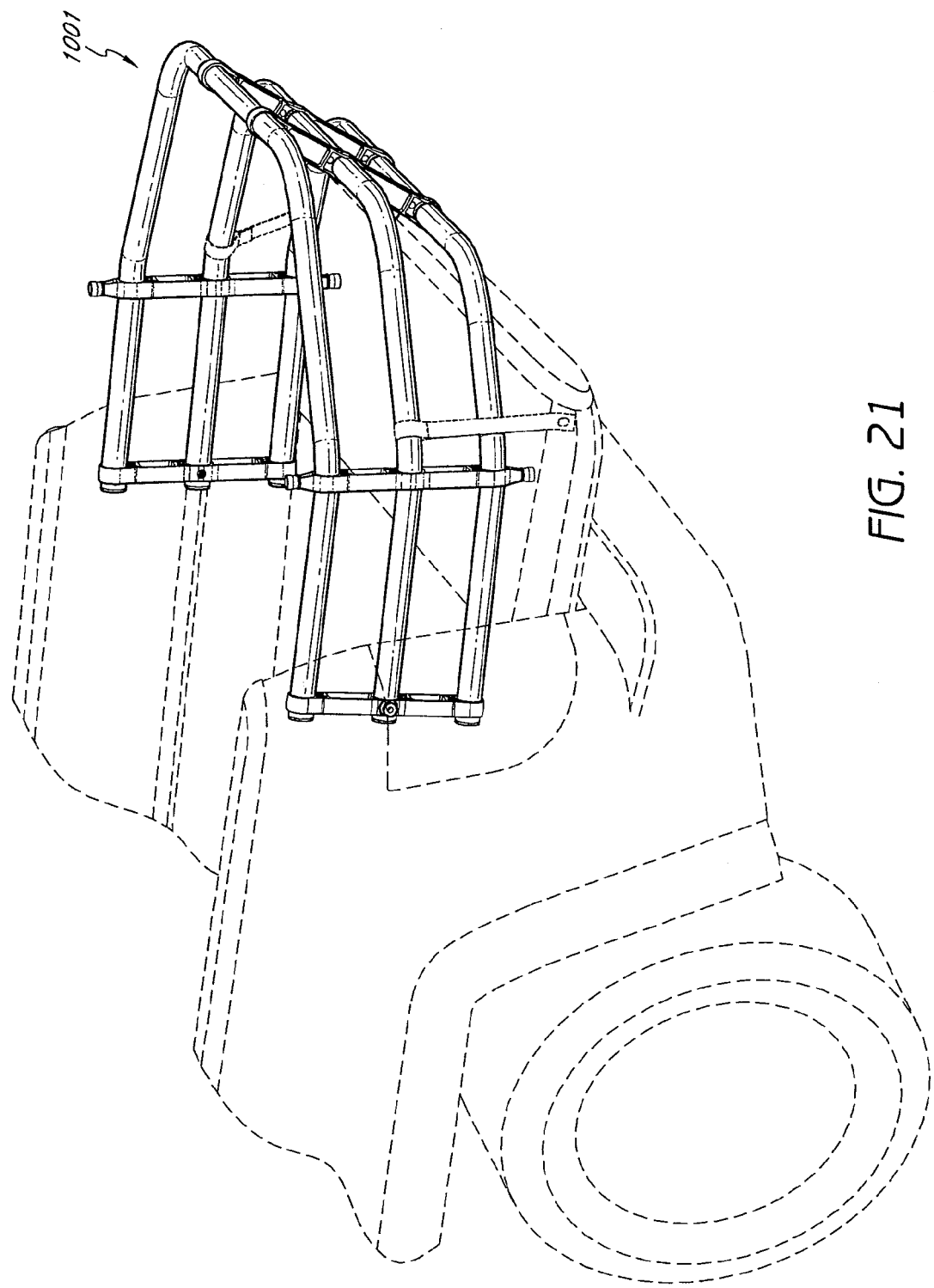
FIG. 21 is a perspective view of another embodiment of a truck tailgate enclosure of the present invention mounted on a truck over the tailgate.
Figure 22:
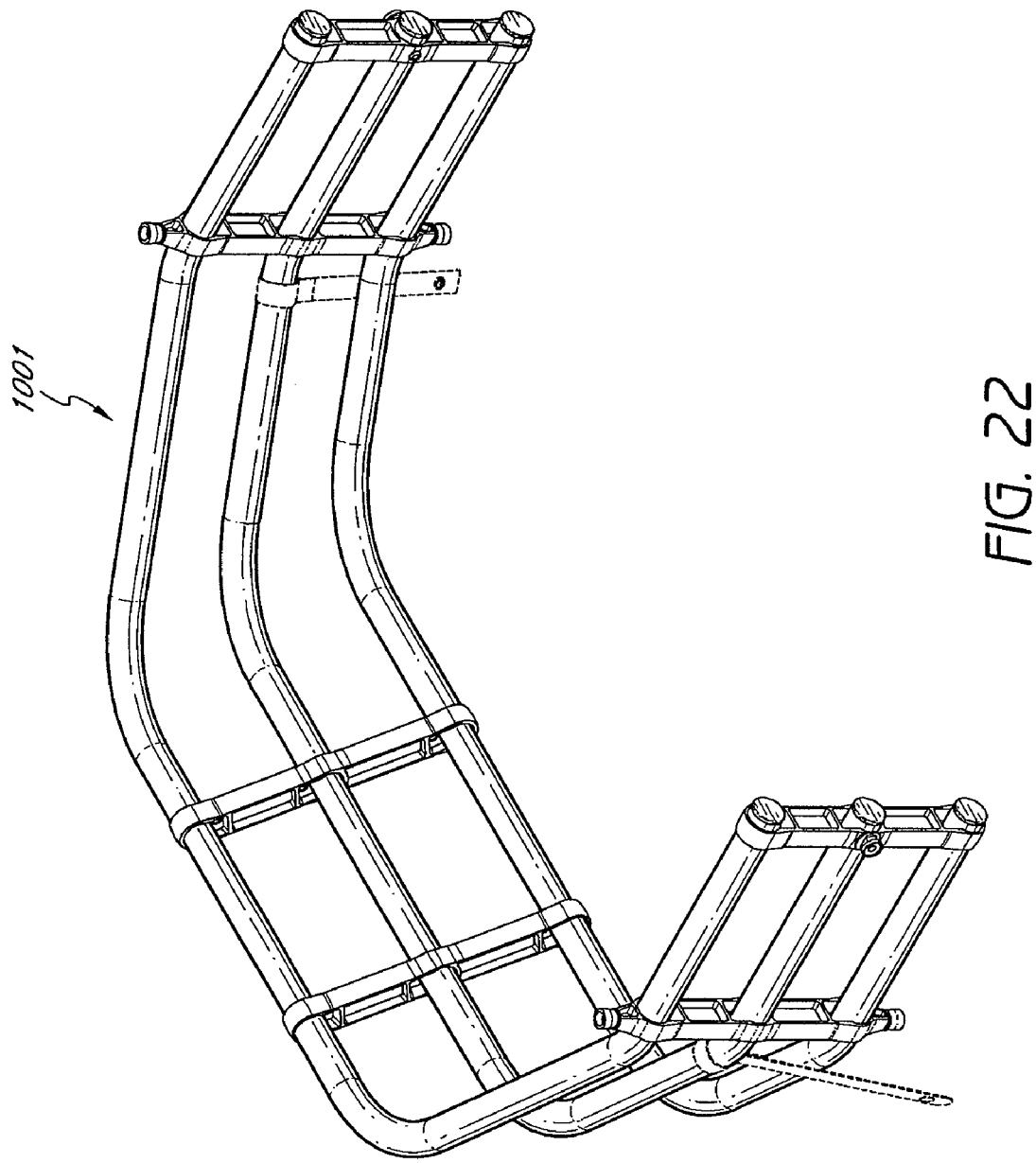
FIG. 22 is a perspective view of the truck tailgate enclosure of FIG. 21.

With reference to FIGS. 21 and 22, another embodiment of the tailgate enclosure 1001 is shown. The tailgate enclosure 1001 is generally similar to the above described tailgate enclosure 100 however; the tailgate enclosure 1001 includes tubular members that comprise a generally circular cross-sectional shape. The tailgate enclosure 1001 illustrated in FIGS. 21 and 22 also comprises an additional set of uprights. The additional set of uprights are configured to act as bumpers and are configured to be located centrally on the side walls of the tailgate enclosure. The tailgate enclosure shown in FIGS. 21 and 22 comprises a generally sloped back wall which is substantially similar to the back wall 106 of the above described embodiment. However the sloped back wall of the tailgate enclosure of FIGS. 21 and 22 extends past a distal end of the tailgate so as to provide additional space to the cargo bed.

Although the previous embodiments shown in FIGS. 1-22 have a generally U-shaped that is generally rigid, it can be appreciated by one skilled in the art that the bed extender may be foldable as to collapse to an altered shape when not in use. Such an embodiment can include folding connections near the transitions from the side walls to the back wall. The foldable connections can be preferably configured such that the side walls can fold back and against the back wall. The foldable connections may be any suitable pivotal connections such as hinges or flexible inserts. Furthermore, any number of foldable connections can be used which may allow the tailgate extender to be folded down a substantially small size.

Figure 23:
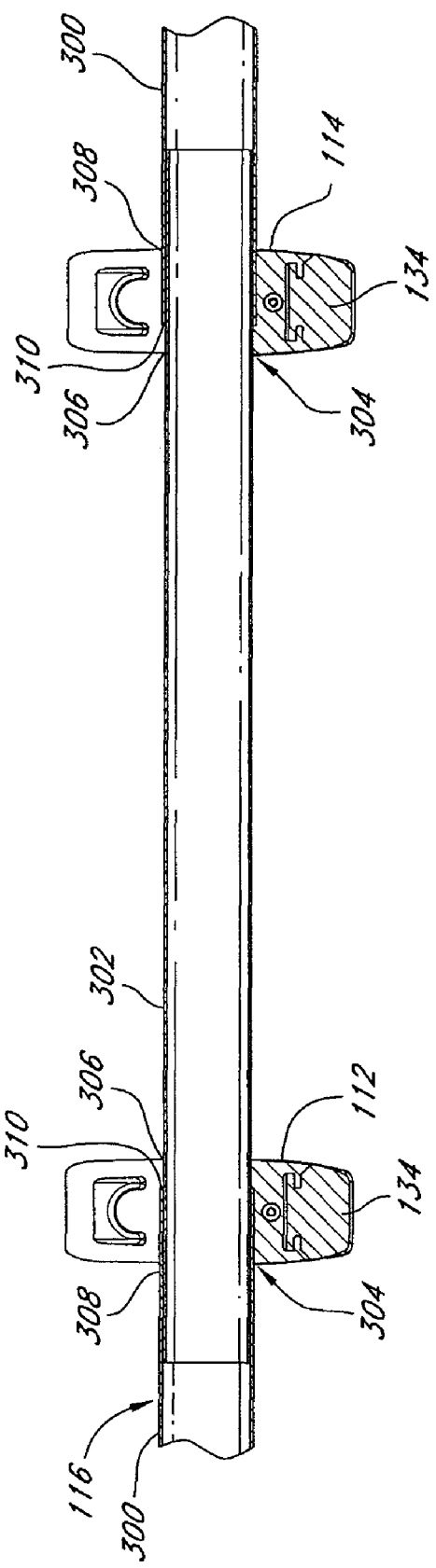
FIG. 23 is cross-sectional back view of an embodiment of a tailgate enclosure with a telescopic back wall system.

With reference to FIG. 23, a cross-sectional view of a cross member 116 and rear uprights 112 and 114 is shown. The cross member 116 is preferably comprised of three members including the two side members 300 and the central member 302. The central member 302 a preferably sized so as to insert into the side members 300. This allows the central member 302 to slide within the side members 300. That is the central member telescopically engages the side members 300. The uprights 112 and 114 further define a stepped hole 304 which is configured to receive and clamp the members 300 and 302. The stepped hole 304 is configured have a first size and shape 308 which is configured to match the shape of the member 300 and a second size and shape 306 which is configured to match the shape of the central member 302. This configuration allows the members 300 and 302 to be adjusted relative to one another and then to be clamped in position with the over edge of the member 300 so be at least partially covered by the uprights 112 and 114. The end of the tubular member 300 may also locate axially with the uprights 112 and 114 at a edge 310 of the hole 304. The edge 310 may also transition the hole 304 from the first size and shape 308 to the second size and shape 306. This arrangement shown in FIG. 23 allows a tailgate enclosure to have an adjustable width with may allow the tailgate enclosure to compensate for width variations in various vehicles. In various embodiments, an adjustable width tubular member, such as that illustrated in FIG. 23 can have a cylindrical profile or a non-cylindrical profile such as that described and illustrated above with respect to FIG. 12.

Although the cargo tailgate enclosure 100, 1001 has been disclosed in the context of certain preferred embodiments and examples, it will be understood by those skilled in the art that the cargo tailgate enclosure extends beyond the specifically disclosed embodiments to other alternative embodiments and/or users of the invention and obvious modifications and equivalent thereof. In particular, while the present cargo tailgate enclosure has been described in the context of a particularly preferred embodiment, a skilled artisan will appreciate in view of the present disclosure that certain advantages, features and aspects of the cargo tailgate enclosure may be realized in a variety of other applications, many of which have been noted above. Additionally, it is contemplated that various aspects and features of the invention described can be practiced separately, combined together, or substituted for one another, and that a variety of combinations and subcombinations of the features and aspects can be made and still fall within the scope of the inventions. Thus, it is intended that the scope of the present invention herein disclosed, should not be limited by the particular disclosed embodiments described above but should be determined only by a fair reading of the claims.

What is claimed is:

1. A vehicle tailgate enclosure for use with a vehicle having an open storage bed having a rear end, a first upstanding side panel defining one side of said bed, a second upstanding side panel defining an opposite side of said bed, and a tailgate, said tailgate enclosure mountable in a first position in which said tailgate enclosure comprises:
   a first side wall coupled to the first side panel;
   a second side wall coupled to the second side panel; and
   a connecting wall which connects said first side wall and said second side wall, said connecting wall comprising:
      a plurality of cross-members having a non-circular cross-section, the non-circular cross-section have a height extending generally vertically and a width extending generally horizontally, the height being greater than the width; and
      a plurality of struts, each strut defining a plurality of openings, each of said plurality of openings sized and shaped to receive and retain one of said plurality of cross-members, wherein the cooperation of said non-circular cross-section of said cross-members and the size and shape of the openings substantially restrains the cross-members from rotating.

2. The tailgate enclosure of claim 1, wherein said tailgate enclosure is moveable from said first position to a second position with said tailgate enclosure positioned between said first side panel and said second side panel such that said connecting wall is positioned over said bed forward of said rear end with said first side wall and said second side wall extending forward toward the connecting wall.

3. The tailgate enclosure of claim 1, wherein said first side wall and said second side wall each comprise a plurality of cross-members having a non-circular cross-section and a plurality of vertical struts, each vertical strut defining a plurality of openings, each of said plurality of openings sized and shaped to receive and retain one of said plurality of cross-members.

4. The tailgate enclosure of claim 1, wherein said first side wall comprises at least in part said plurality of cross-members of said connecting wall and said second wall comprises of least in part said plurality of cross-members of said connecting wall.

5. The tailgate enclosure of claim 4, wherein said first wall and said second wall each further comprise at least one vertical strut, said vertical strut defining a plurality of openings, each of said plurality of openings sized and shaped to receive and retain one of said plurality of cross-members.

6. The tailgate enclosure of claim 5, wherein said at least one vertical strut of said first wall covers a distal end of said plurality of cross-members.

7. The tailgate enclosure of claim 1, wherein each of said plurality of vertical struts comprise two mating sections which couple to secure said plurality of cross-members within said plurality of openings.

8. The tailgate enclosure of claim 4, wherein each of said plurality of cross-members is bent so that a first portion of said tubular member extends transverse to a second portion of said tubular member.

9. The tailgate enclosure of claim 1, wherein the cross-members each have a non-circular cross section comprising:
   a pair of opposing curved sidewalls having a first radius of curvature and defining a height of the cross-members; and
   a pair of opposing curved end walls having a second radius of curvature and defining a width of the cross-members.

10. The tailgate enclosure of claim 9, wherein the ratio of the first radius of curvature to the height of the cross-members is approximately 1.110:1.

11. The tailgate enclosure of claim 9, wherein the ratio of the second radius of curvature to the width of the cross members is approximately 1.117:1.

* * * * *